United States Patent
Zhou et al.

(10) Patent No.: US 10,728,514 B2
(45) Date of Patent: Jul. 28, 2020

(54) IMAGING SYSTEM AND METHOD

(71) Applicant: SZ DJI TECHNOLOGY CO., LTD., Shenzhen (CN)

(72) Inventors: Guyue Zhou, Shenzhen (CN); Ketan Tang, Shenzhen (CN); Xingyu Zhang, Shenzhen (CN); Cong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/596,197

(22) Filed: May 16, 2017

(65) Prior Publication Data
US 2017/0251193 A1   Aug. 31, 2017

Related U.S. Application Data

(63) Continuation of application No. PCT/CN2014/092992, filed on Dec. 4, 2014.

(51) Int. Cl.
*H04N 13/128* (2018.01)
*H04N 13/246* (2018.01)
(Continued)

(52) U.S. Cl.
CPC ............ *H04N 13/128* (2018.05); *G01C 3/08* (2013.01); *G01C 11/06* (2013.01); *G06T 7/593* (2017.01);
(Continued)

(58) Field of Classification Search
CPC .. H04N 13/128; H04N 13/246; H04N 13/296; H04N 13/239; H04N 2013/0081;
(Continued)

(56) References Cited

U.S. PATENT DOCUMENTS 6,023,588 A    2/2000  Ray et al.
9,319,660 B2 * 4/2016  Liou ................ H04N 13/239
(Continued)

FOREIGN PATENT DOCUMENTS

CN    101276138 A    10/2008
CN    101727670 A    6/2010
(Continued)

OTHER PUBLICATIONS

The World Intellectual Property Organization (WIPO) International Search Report and Written Opinion for PCT/CN2014/092992 dated Sep. 11, 2015 9 Pages.
(Continued)

*Primary Examiner* — Joseph G Ustaris
*Assistant Examiner* — Jimmy S Lee
(74) *Attorney, Agent, or Firm* — Anova Law Group, PLLC

(57) ABSTRACT

A system for automatically adjusting a baseline of an imaging system for stereoscopic imaging and methods for making and using same. The imaging system includes a plurality of imaging devices that cooperate via a baseline adjustment mechanism. The imaging devices can acquire images of an object of interest and ascertain an object distance between the stereoscopic imaging system and the object of interest using triangulation. Based on the object distance, the baseline adjustment mechanism automatically adjusts a baseline between any pair of imaging devices. The baseline can be reduced when the object of interest is proximate to the imaging system and can be increased when the object of interest is distal. Once the baseline has been adjusted, one or more extrinsic parameters of the imaging devices are calibrated using a two-step optimization method. The imaging system is suitable for use aboard a mobile platform such as an unmanned aerial vehicle.

20 Claims, 17 Drawing Sheets

(51) Int. Cl.
*H04N 13/296* (2018.01)
*G01C 11/06* (2006.01)
*H04N 13/239* (2018.01)
*G06T 7/593* (2017.01)
*G01C 3/08* (2006.01)
*G01S 11/12* (2006.01)
*B64C 39/02* (2006.01)
*H04N 13/00* (2018.01)

(52) U.S. Cl.
CPC ......... *H04N 13/239* (2018.05); *H04N 13/246* (2018.05); *H04N 13/296* (2018.05); *B64C 39/024* (2013.01); *B64C 2201/123* (2013.01); *G01S 11/12* (2013.01); *G06T 2207/10012* (2013.01); *G06T 2207/10032* (2013.01); *H04N 2013/0081* (2013.01); *H04N 2213/001* (2013.01)

(58) Field of Classification Search
CPC .............. H04N 2013/001; G06T 7/593; G06T 2207/10012; G06T 2207/10032; G01C 3/08; G01C 11/06; B64C 39/024; B64C 2201/123; G01S 11/12
USPC ........................................................... 348/47
See application file for complete search history.

(56) References Cited

U.S. PATENT DOCUMENTS

| | | | | |
|---|---|---|---|---|
| 2002/0135468 | A1* | 9/2002 | Bos ........................ | B60N 2/002 340/436 |
| 2006/0115126 | A1* | 6/2006 | Watanabe .......... | G06K 9/00362 382/106 |
| 2006/0120712 | A1* | 6/2006 | Kim ....................... | H04N 5/272 396/333 |
| 2007/0091174 | A1* | 4/2007 | Kochi ................. | G01B 11/2509 348/135 |
| 2011/0063417 | A1* | 3/2011 | Peters, II .................. | G06T 7/85 348/47 |
| 2012/0120193 | A1* | 5/2012 | Shimizu ............... | H04N 19/597 348/E13.062 |
| 2012/0257016 | A1* | 10/2012 | Nakajima ............... | G06T 17/20 348/46 |
| 2012/0327197 | A1* | 12/2012 | Yamashita ............. | G03B 35/08 348/50 |
| 2013/0010057 | A1* | 1/2013 | Borel .................... | H04N 13/128 348/42 |
| 2013/0266180 | A1* | 10/2013 | Jin ......................... | H04N 5/232 382/103 |
| 2014/0015938 | A1* | 1/2014 | Sasaki ...................... | G03B 5/02 348/47 |
| 2014/0098195 | A1* | 4/2014 | Pace ...................... | H04N 13/25 348/47 |
| 2014/0184751 | A1* | 7/2014 | Liou ..................... | H04N 13/239 348/47 |
| 2014/0218490 | A1* | 8/2014 | Norkin ................. | H04N 13/178 348/51 |
| 2015/0058102 | A1* | 2/2015 | Christensen ........ | H04N 13/189 705/14.6 |

FOREIGN PATENT DOCUMENTS

| | | |
|---|---|---|
| CN | 102298818 A | 12/2011 |
| CN | 202075794 U | 12/2011 |
| CN | 202600337 U | 12/2012 |
| CN | 102980556 A | 3/2013 |
| CN | 202814399 U | 3/2013 |
| CN | 103424105 A | 12/2013 |
| CN | 103888750 A | 6/2014 |
| JP | 2001041740 A | 2/2001 |
| JP | 2001305681 A | 11/2001 |
| JP | 2003090711 A | 3/2003 |
| JP | 2009047496 A | 3/2009 |
| JP | 2011145143 A | 7/2011 |
| JP | 2012189324 A | 10/2012 |
| JP | 2013038640 A | 2/2013 |
| JP | 2013242378 A | 12/2013 |
| WO | 2006016534 A1 | 2/2006 |
| WO | 2013029696 A1 | 3/2013 |
| WO | 2014002849 A1 | 1/2014 |
| WO | 2014167475 A1 | 10/2014 |

OTHER PUBLICATIONS

Jain, Ramesh et al., Machine Vision, 1995, pp. 73, McGraw-Hill, Inc.

* cited by examiner

IMAGING SYSTEM AND METHOD

CROSS-REFERENCE TO RELATED APPLICATION

This is a continuation application of International Application No. PCT/CN2014/092992, filed on Dec. 4, 2014, the entire contents of which are incorporated herein by reference.

FIELD

The disclosed embodiments relate generally to digital imaging and more particularly, but not exclusively, to systems and methods for adjusting a baseline.

BACKGROUND

Stereoscopic imaging, a technique whereby multiple imaging devices are used to form a three dimensional image through stereopsis, is becoming increasingly common in many fields. Stereoscopic imaging is particularly useful in robotics, where it is often desirable to gather three-dimensional information about a machine's environment. Stereoscopic imaging simulates the binocular visions of human eyes, which apply the principle of stereopsis to achieve depth perception. This technique can be reproduced by artificial imaging, devices by viewing a given object of interest using multiple imaging devices from slightly different vantage points. Differences between varying views of the object of interest convey depth information about the object's position, thereby enabling three-dimensional imaging of the object.

The ability of an imaging system per stereoscopic imaging to resolve depth is a function of a baseline, a distance between two imaging devices. The baseline limits the effective field-of-vision of the system for stereoscopic imaging in different ways. When the baseline is too small, for example, the imaging system cannot resolve distant objects. When the baseline is too large, the imaging system cannot see nearby objects (resulting in blind spots for the nearby objects). Additionally, when the baseline is too large, the overlap in the fields-of-vision of the two imaging devices is reduced, limiting the number of objects that can be viewed with depth perception. Furthermore, large, fixed baselines can take up large amounts of space and can be unwieldy. Thus, in most current systems for stereoscopic imaging, the baseline is fixed depending on whether imaging of nearby or far away objects is typically desired.

In view of the foregoing, there is a need for imaging systems and methods that support automatic baseline adjustment for stereoscopic imaging.

SUMMARY

In accordance with a first aspect disclosed herein, there is set forth a method for automatically adjusting a baseline of an imaging system having a plurality of imaging devices, including at least a first imaging device and a second imaging device, comprising:

acquiring an object distance between the imaging system and an object of interest; and automatically adjusting the baseline according to the object distance.

In an exemplary embodiment of the disclosed methods, acquiring the object distance comprises:

acquiring a first image of the object of interest using the first imaging device;

acquiring a second image of the object of interest using the second imaging device;

determining a binocular disparity between the first image and the second image; and determining the object distance using the binocular disparity.

In an exemplary embodiment of the disclosed methods, acquiring the object distance further comprises rectifying the first image and the second image prior to determining the binocular disparity.

In an exemplary embodiment of the disclosed methods, acquiring the object distance comprises.

acquiring a plurality of feature points on the object of interest;

determining respective feature distances between the imaging system and each of the feature points; and determining the object distance using the feature distances.

In an exemplary embodiment of the disclosed methods, determining the object distance comprises determining the object distance based on an average of the feature distances.

In an exemplary embodiment of the disclosed methods, determining the object distance comprises selecting one or more of the feature points and acquiring the object distance based on the features distances of the selected feature points.

In an exemplary embodiment of the disclosed methods, selecting the feature points comprises selecting a predetermined percentage of feature points that are closest to the imaging system and acquiring the object distance as the feature distance of the selected feature point that is farthest from the imaging system.

In an exemplary embodiment of the disclosed methods, the predetermined percentage of the selected feature paints is eighty percent.

In an exemplary embodiment of the disclosed methods, determining the respective feature distances between the imaging system and each of the feature points comprises determining the feature distances based on pixels corresponding to the feature points on an image acquired by the first imaging device or the second imaging device.

In an exemplary embodiment of the disclosed methods, acquiring the object distance comprises acquiring the object distance using a laser.

In an exemplary embodiment of the disclosed methods, acquiring the object distance comprises acquiring the object distance using an ultrasound system.

In an exemplary embodiment of the disclosed methods, the automatically adjusting comprises increasing the baseline if the baseline is below a minimum baseline.

In an exemplary embodiment of the disclosed methods, the minimum baseline is 4*Z*L/f, and wherein Z is the object distance, L is a pixel width of at least one of the imaging devices, and f is a focal distance of at least one of the imaging devices.

In an exemplary embodiment of the disclosed methods, the automatically adjusting comprises decreasing the baseline if the baseline is above a maximum baseline.

In an exemplary embodiment of the disclosed methods, the automatically adjusting comprises increasing the baseline if the baseline is below the maximum baseline.

In an exemplary embodiment of the disclosed methods, the maximum baseline is tan(θ/2), and wherein is the object distance and θ is an angle-of-vision of at least one of the imaging devices.

In an exemplary embodiment of the disclosed methods, the automatically adjusting comprises increasing the baseline until a field-of-vision of the first imaging device overlaps with a field-of-vision of the second imaging device by at least a threshold value.

Exemplary embodiments of the disclosed methods further comprise calibrating extrinsic parameters of the imaging system after automatic adjustment of the baseline.

In an exemplary embodiment of the disclosed methods, the calibrating comprises calibrating at least one of a translational extrinsic parameter and/or a rotational extrinsic parameter of the imaging system.

In an exemplary embodiment of the disclosed methods, the calibrating comprises initially calibrating the translational extrinsic parameters according to the automatically adjusting the baseline.

In an exemplary embodiment of the disclosed methods, the calibrating comprises further calibrating the extrinsic parameter to optimize the extrinsic parameter after the initially calibrating.

In an exemplary embodiment of the disclosed methods, the further calibration comprises a bundle adjustment.

In an exemplary embodiment of the disclosed methods, the imaging system is a mobile platform.

In an exemplary embodiment of the disclosed methods, the imaging system is an unmanned aerial vehicle (UAV), and wherein the automatically adjusting is dependent on a flight mode of the UAV.

In an exemplary embodiment of the disclosed methods, the automatically adjusting comprises decreasing the baseline when the flight mode is a landing mode.

In an exemplary embodiment of the disclosed methods, the automatically adjusting comprises increasing the baseline when the flight mode is a takeoff mode.

In an exemplary embodiment of the disclosed methods, the automatically adjusting compasses increasing the baseline when the flight mode is an aerial image acquisition mode.

In accordance with another aspect disclosed herein, there is set forth an imaging system configured to perform automatic baseline adjustment in accordance with any one of the above methods.

In accordance with another aspect disclosed herein, there is set forth a computer program product comprising instruction for automatically adjusting a baseline of an imaging system having a first imaging device and a second imaging device in accordance with any one of the above methods.

In accordance with another aspect disclosed herein, there is set forth an apparatus for automatically adjusting a baseline between a first imaging device and a second imaging device of an imaging system having a plurality of imaging devices, comprising:

a baseline adjustment mechanism being coupled with the first and second imaging devices; and a controller configured to provide a control signal to the baseline adjustment mechanism for automatically adjusting the baseline according to an object distance between the imaging system and an object of interest.

In an exemplary embodiment of the disclosed apparatus, the controller is configured to acquire the of distance by:

acquiring a first image of the object of interest using the first imaging device;

acquiring a second image of the object of interest using the second imaging device;

determining a binocular disparity between the first image and the second image; and determining the of distance using the binocular disparity.

In an exemplary embodiment of the disclosed apparatus, the controller is configured to rectify the first and second images prior to determining the binocular disparity.

In an exemplary embodiment of the disclosed apparatus, the controller is configured to acquire the object distance by:

acquiring a plurality f feature points on the object of interest;

determining respective feature distances between the imaging system and each of the feature points; and determining the object distance using the feature distances.

In an exemplary embodiment of the disclosed apparatus, the controller is configured to acquire the object distance based on an average of the feature distances.

In an exemplary embodiment of the disclosed apparatus, the controller is configured to select one or more of the feature points and acquire the object distance based on the features distances of the selected feature points.

In an exemplary embodiment of the disclosed apparatus, the controller is configured to select the feature points by selecting a predetermined percentage of feature points that are closest to the imaging system and acquire the object distance as the feature distance of a selected feature point that is farthest from the imaging system.

In an exemplary embodiment of the disclosed apparatus, the predetermined percentage of selected feature points is eighty percent.

In an exemplary embodiment of the disclosed apparatus, determining the respective feature distances between the imaging system and each of the feature points comprises determining the feature distances based on pixels corresponding to the feature points on an image acquired by the first imaging device or the second imaging device.

Exemplary embodiments of the disclosed apparatus further comprise a laser for acquiring the object distance.

Exemplary embodiments of the disclosed apparatus further comprise an ultrasound system for acquiring the object distance.

In an exemplary embodiment of the disclosed apparatus, the baseline adjustment mechanism comprises a screw shaft mechanism.

In an exemplary embodiment of the disclosed apparatus, the baseline adjustment mechanism comprises a rack and pinion mechanism.

In an exemplary embodiment of the disclosed apparatus, the baseline adjustment mechanism comprises a slider and crank mechanism.

In an exemplary embodiment of the disclosed apparatus, the baseline adjustment mechanism comprises a linear motor.

In an exemplary embodiment of the disclosed apparatus, the baseline adjustment mechanism comprises an adjustable frame.

In an exemplary embodiment of the disclosed apparatus, the control signal is a signal to automatically increase the baseline if the baseline is below a minimum baseline.

In an exemplary embodiment of the disclosed apparatus, the minimum baseline is $4*Z*L/f$, and wherein $Z$ is the object distance, $L$ is a pixel width of at least one of the imaging devices, and $f$ is a focal distance of at least one the imaging devices.

In an exemplary embodiment of the disclosed apparatus, the control signal is a signal to automatically decrease the baseline if the baseline is above a maximum baseline.

In an exemplary embodiment of the disclosed apparatus, the control signal is a signal to automatically increase the baseline if the baseline is below a maximum baseline.

In an exemplary embodiment of the disclosed apparatus, the maximum baseline is $Z*\tan(\theta/2)$, and wherein Z is the object distance and $\theta$ is an angle-of-vision of at least one of the imaging devices.

In an exemplary embodiment of the disclosed apparatus, the controller is configured automatically increase the baseline until a field-of-vision of the first imaging device overlaps with a field-of-vision of the second imaging device by at least a threshold value.

In an exemplary embodiment of the disclosed apparatus, the controller is configured to calibrate extrinsic parameters of the imaging system after the automatic adjustment of the baseline.

In an exemplary embodiment of the disclosed apparatus, the controller is configured to calibrate at least one of a translational extrinsic parameter and/or a rotational extrinsic parameter.

In an exemplary embodiment of the disclosed apparatus, the controller is configured to initially calibrate the translational extrinsic parameters according to a linear displacement of the baseline adjustment mechanism.

In an exemplary embodiment of the disclosed apparatus, the baseline adjustment mechanism comprises a screw shaft mechanism and the controller is configured to initially calibrate the translational extrinsic parameters according to the degree of rotation of the screw shaft mechanism.

In an exemplary embodiment of the disclosed apparatus, the controller is configured to further calibrate the extrinsic parameters to optimize the extrinsic parameters after the initially calibrating.

In an exemplary embodiment of the disclosed apparatus, the controller is configured to further calibrate the extrinsic parameters using a bundle adjustment.

In an exemplary embodiment of the disclosed apparatus, the imagine system is a mobile platform.

In an exemplary embodiment of the disclosed apparatus, the imaging system is an unmanned aerial vehicle (UAV).

In an exemplary embodiment of the disclosed apparatus, the controller is configured to automatically adjust the baseline depending on a flight mode of the UAV.

In an exemplary embodiment of the disclosed apparatus, the controller is configured to decrease the baseline when the flight mode is a landing mode.

In an exemplary embodiment of the disclosed apparatus, the controller is configured to increase the baseline when the flight mode is a takeoff mode.

In an exemplary embodiment of the disclosed apparatus, the controller is configured to increase the baseline when the flight mode is an aerial image acquisition mode.

In accordance with another aspect disclosed, herein, there is set forth an imaging system, comprising:
  a plurality of imaging devices, including at least a first imaging device for imaging an object of interest and a second imaging device for imaging the object of interest;
  a baseline adjustment mechanism for adjusting a baseline between the first imaging device and the second imaging device; and
  a controller configured to automatically adjust the baseline using the baseline adjustment mechanism according to an object distance between the imaging system and the object of interest.

In an exemplary embodiment of the disclosed imaging system, the controller is configured to acquire the object distance by:
  acquiring a first image of the object of interest using the first imaging device;
  acquiring a second image of the object of interest using the second imaging device;
  determining a binocular disparity between the first image and the second image; and
  determining the object distance using the binocular disparity.

In an exemplary embodiment of the disclosed imaging system, the controller is configured to rectify the first and second images prior to determining the binocular disparity.

In an exemplary embodiment of the disclosed imaging system, the controller is configured to acquire the object distance by:
  acquiring a plurality of feature points on the object of interest;
  determining respective feature distances between the imaging system and each of the feature points; and
  determining the object distance using the feature distances.

In an exemplary embodiment of the disclosed imaging system, the controller is configured to acquire the object distance based on an average of the feature distances.

In an exemplary embodiment of the disclosed imaging system, the controller is configured to select one or more of the feature points and acquire the object distance based on the features distances of the selected feature points.

In an exemplary embodiment of the disclosed imaging system, the controller is configured to select the feature points by selecting a predetermined percentage of feature points that are closest to the imaging system and acquire the object distance as the feature distance of a selected feature point that is farthest from the imaging system.

In an exemplary embodiment of the disclosed imaging system, the predetermined percentage of selected feature points is eighty percent.

In an exemplary embodiment of the disclosed imaging system, determining the respective feature distances between the imaging system and each of the feature points comprises determining the feature distances based on pixels corresponding to the feature points on an image acquired by the first imaging device or the second imaging device.

Exemplary embodiments of the disclosed imaging system further comprising a laser for acquiring the object distance.

Exemplary embodiments of the disclosed imaging system further comprise an ultrasound system for acquiring the object distance.

In an exemplary embodiment of the disclosed imaging system, the baseline adjustment mechanism comprises a screw shaft mechanism.

In an exemplary embodiment of the disclosed imaging system, the baseline adjustment mechanism comprises a rack and pinion mechanism.

In an exemplary embodiment of the disclosed imaging system, the baseline adjustment mechanism comprises a slider and crank mechanism.

In an exemplary embodiment of the disclosed imaging system, the baseline adjustment mechanism comprises a linear motor.

In an exemplary embodiment of the disclosed imaging system, the baseline adjustment mechanism comprises an adjustable frame.

In an exemplary embodiment of the disclosed imaging system, the controller is configured to automatically increase the baseline if the baseline is below a minimum baseline.

In an exemplary embodiment of the disclosed imaging system, the minimum baseline is $4*Z*L/f$, and wherein Z is the object distance, L is a pixel width of at least one of the imaging devices, and f is a focal distance of at least one of the imaging devices.

In an exemplary embodiment of the disclosed imaging system, the controller is configured to automatically decrease the baseline if the baseline is above a maximum baseline.

In an exemplary embodiment of the disclosed imaging system, the controller is configured to automatically increase the baseline if the baseline is below a maximum baseline.

In an exemplary embodiment of the disclosed imaging system, the maximum baseline is $Z*\tan(\theta/2)$, and wherein Z is the object distance and $\theta$ is an angle-of-vision of at least one of the imaging devices.

In at exemplary embodiment of the disclosed imaging system, the controller is configured automatically increase the baseline until a field-of-vision of the first imaging device overlaps with a field-of-vision of the second imaging device by at least a threshold value.

In an exemplary embodiment of the disclosed imaging system, the controller is configured to calibrate extrinsic parameters of the imaging system after the automatic adjustment of the baseline.

In an exemplary embodiment of the disclosed imaging system, the controller is configured to calibrate at least one of a translational extrinsic parameter and/or a rotational extrinsic parameter.

In an exemplary embodiment of the disclosed imaging system, the controller is configured to initially calibrate the translational extrinsic parameters according to a linear displacement of the baseline adjustment mechanism.

In an exemplary embodiment of the disclosed imaging system, the baseline adjustment mechanism comprises a screw shaft mechanism and the controller is configured to initially calibrate the translational extrinsic parameters according to the degree of rotation of the screw shaft mechanism.

In an exemplary embodiment of the disclosed imaging system, the controller is configured to further calibrate the extrinsic parameters to optimize the extrinsic parameters after the initially calibrating.

In an exemplary embodiment of the disclosed imaging system, the controller configured to further calibrate the extrinsic parameters using a bundle adjustment.

In a exemplary embodiment of the disclosed imaging system, the imaging system is a mobile platform.

In an exemplary embodiment of the disclosed imaging system, the mobile platform is an unmanned aerial vehicle (UAV).

In an exemplary embodiment of the disclosed imaging system, the controller is configure to automatically adjust the baseline depending on a flight mode of the UAV.

In an exemplary embodiment of the disclosed imaging system, the controller is configured to decrease the baseline when the flight mode is a landing mode.

In an exemplary embodiment of the disclosed imaging system, the controller is configured to increase the baseline when the flight mode is a takeoff mode.

In an exemplary embodiment of the disclosed imaging system the controller is configured to increase the baseline when the flight mode is an aerial image acquisition mode.

Figure 1:
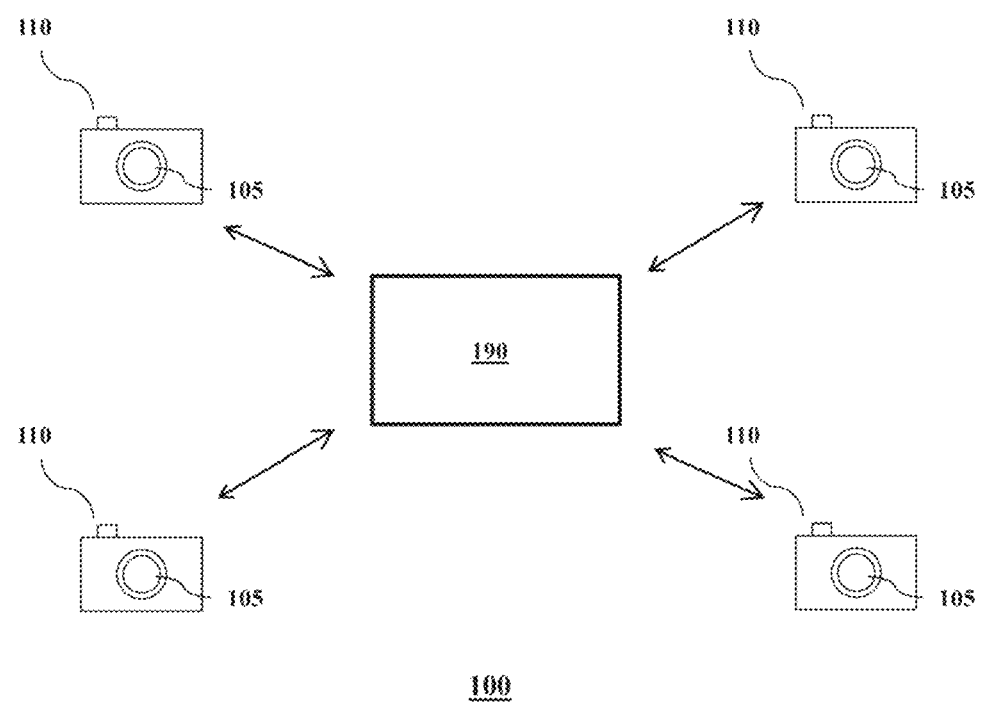
FIG. 1 is an exemplary top-level block diagram illustrating an embodiment of an imaging system including a plurality of imaging devices.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION OF THE EMBODIMENTS

The present disclosure sets forth systems and methods for automatically adjusting a baseline of an imaging system for stereoscopic imaging, which systems and methods overcome the limitations of conventional fixed-baseline imaging systems. Further, imaging devices in an imaging system are finely calibrated by a set of extrinsic parameters. These extrinsic parameters define the relative positions of the imaging devices, enabling the reconstruction of a single three-dimensional object based on different two-dimensional images taken from different perspectives. After the baseline is adjusted, the corresponding extrinsic parameters may also be adjusted before further imaging. Accordingly, the present disclosure also sets forth systems and methods for automatically calibrating the extrinsic parameters after a baseline adjustment.

Turning now to FIG. 1, an exemplary imaging system 100 is shown as including a plurality of imaging devices 110 and a controller 190. The imaging system 100 can include any predetermined number of imaging devices 110, as desired. For example, the imaging system 100 can have 2, 3, 4, 5, 6, or even a greater number of imaging devices 110. As a non-limiting example, FIG. 1 shows the imaging system 100 as including four imaging devices 110. Although various additional embodiments of imaging systems 100 are shown and described herein as having two imaging devices 110 for illustrative purposes only, the imaging system 100 is not limited to having only two imaging devices 110. For imaging systems 100 having more than two imaging devices 110, the automatic baseline adjustment and parameter calibration illustrated herein can be applied as to any pair of imaging devices 110.

The imaging devices 110 can be arranged in any desired manner in the imaging system 100. The specific arrangement of imaging devices 110 can depend on the imaging application. In some embodiments, for example, the imaging devices 110 can be positioned side-by-side so that the imaging devices 110 have parallel optical axes 130 (shown in FIG. 5). In other embodiments, the imaging devices 110 can positioned such that the optical axes 130 of at least two of the imaging devices 110 are not parallel. A linear distance between the centers (also referred to herein as the origins) of any two imaging devices 110 is a baseline b (shown in FIG. 2) between these imaging devices 110. More particularly, the baseline b can refer to a distance between a center of a lens 105 of a first imaging device 110 and a center of a lens 105 of a second imaging device 110.

Each imaging device 110 can perform the function of sensing light and converting the sensed light into electronic signals that can be ultimately rendered as an image. Exemplary imaging devices 110 suitable for use with the disclosed systems and methods, include, but are not limited to, commercially-available cameras and camcorders. Suitable imaging devices 110 can include analog imaging devices (for example, video camera tubes) and/or digital imaging devices (for example, charge-coupled device (CCD), complementary metal-oxide-semiconducor (CMOS), N-type metal-oxide-semiconductor (NMOS) imaging devices, and hybrids/variants thereof). Digital imaging devices, for example, can include a two-dimensional array of photosensor elements (not shown) that can each capture one pixel of image information. In some embodiments, the imaging device 110 has a resolution of at least 0.1 Megapixels, 0.5 Megapixels, 1 Megapixel, 2 Megapixels, 5 Megapixels, 10 Megapixels, 20 Megapixels, 50 Megapixels, 100 Megapixels, or an even greater number of pixels. The imaging device 110 can also include a lens 105 for focusing light onto the photosensor elements, such as digital single-lens reflex (DSLR) lens, pin-hole biological lens, simple convex glass lens, macro lens, zoom lens, telephoto lens, fisheye lens, wide-angle lens, or the like. The imaging device 110 can also include apparatus (not shown) that separates and/or filters the sensed light based on color and directs the light onto the appropriate photosensor elements. For example, the imaging device 110 can include a color filter array that passes red, green, or blue light to selected pixel sensors and forms an interlaced color mosaic grid in a Bayer pattern. Alternatively, for example, the imaging device 110 can include an array of layered pixel photosensor elements that separates light of different wavelengths based on the properties of the photosensor elements. The imaging device 110 can have specialty functions for use in various applications such as thermography, creation of multi-spectral images, infrared detection, gamma detection, x-ray detection, and the like. The imaging device 110 can include, for example, an electro-optical sensor, a thermal/infrared sensor, a color or monochrome sensor, a multi-spectral imaging sensor, a spectrophotometer, a spectrometer, a thermometer, and/or an illuminometer.

As shown in FIG. 1, the imaging devices 110 can interface with one or more controllers 190. For example, the imaging devices 110 can each acquire two-dimensional images 120 of an object 150 of interest (shown in FIGS. 4-5) and relay the images 120 to the controllers 190 locally and/or remotely via a data communication system (not shown). The controllers 190 can be configured, for example, to reconstruct a three-dimensional depiction of the object 150 of interest using the two-dimensional images 120 via stereopsis, to determine whether a baseline adjustment is needed based on a distance between the imaging devices 110 and the object 150 of interest, to convey and/or to convey control signals to any components of the imaging system 110 for baseline adjustment. Additionally, and/or alternatively, the controllers 190 can be configured to automatically calibrate one or more extrinsic parameters for stereoscopic imaging.

The controller 190 can include any processing hardware needed to perform image acquisition, baseline adjustment, calibration, and any other functions and operations described herein. Without limitation, the controller 190 can include, e.g., one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, or the like, in certain embodiments, the controller 190 can include an image processing engine or media processing unit, which can include specialized hardware for enhancing the speed and efficiency of image capture, filtering, and processing operations. Such, operations include, for example, Bayer transformations, demosaicing operations, noise reduction operations, and/or image sharpening/softening operations.

In certain embodiments, the controller 190 can include specialized hardware for performing baseline adjustment and parameter calibration. For example, specialized hardware can be provided for functions including are not limited to, reconstructing a three-dimensional depiction of the object 150 of interest using the two-dimensional images 120 via stereopsis, determining whether a baseline adjustment is needed distance between the imaging devices 110 and the object 150 of interest, determine an optimal baseline, conveying control signals to any components of the imaging system 100 for baseline adjustment, and/or calibrating one or more extrinsic parameters for stereoscopic imaging.

In some embodiments, the controller 190 is physically located adjacent to the imaging devices 110, in which case data between the controller 190 and the imaging devices 110 can be communicated locally. Local communication may reduce transmission delay to facilitate real-time baseline adjustment, image processing, and parameter calibration. In other embodiments, the controller 190 is to located remotely from the imaging devices 110, for example, due to weight restrictions or other reasons relating to operational environment of the system 100. As a non-limiting example, if the imaging devices 110 are mounted aboard a mobile platform, such as an unmanned aerial vehicle 200 (UAV) (shown in FIGS. 11-13), imaging data can be conveyed to a remote terminal (not shown) for centralized processing, such as a ground terminal at base station. Centralized processing may be used, for example, where multiple UAVs 200 are imaging a given object 150 of interest in a coordinated fashion.

Various communication methods can be used for remote communication between the imaging devices 110 and the controller 190. Suitable communication methods include, for example, radio, Wireless Fidelity (Wi-Fi), cellular, satellite, and broadcasting. Exemplary wireless communication technologies include, but are not limited to, Global System for Mobile Communications (GSM), General Packet Radio Service (GPRS), Code Division Multiple Access (CDMA), Wideband CDMA (W-CDMA), CDMA 2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT), and others.

In some embodiments, the imaging system 100 can include one or more additional hardware components (not shown), as desired. Exemplary additional hardware components include, but are not limited to, memories (for example, a random access memory (RAM), static RAM, dynamic RAM, read-only memory (ROM), programmable ROM, erasable programmable ROM, electrically erasable programmable ROM, flash memory, secure digital (SD) card, etc.), and/or one or more input/output interfaces (for example, universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, and/or proprietary input/output interfaces). Without limitation, one or more input/output devices (for example, buttons, a keyboard, keypad, trackball, displays, and a monitor) can also be included in the imaging system 100, as desired.

Figure 2:
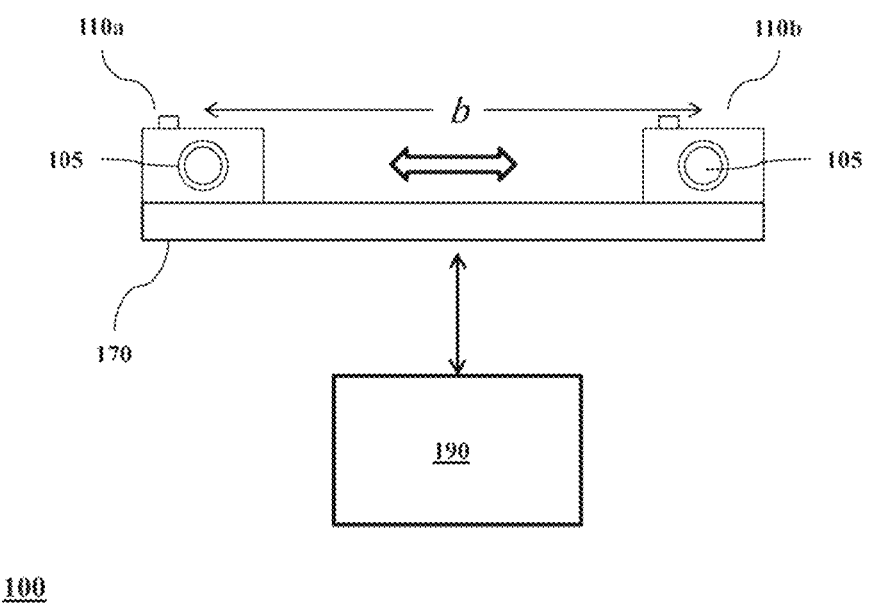
FIG. 2 is an exemplary top-level block diagram illustrating an embodiment of the imaging system of FIG. 1, wherein the imaging system includes a baseline adjustment mechanism for adjusting a baseline.

Turning now to FIG. 2, an exemplary embodiment of an imaging system 100 is shown as including a baseline adjustment mechanism 170 for automatically adjusting a baseline b between a first imaging device 110a and a second imaging device 110b. The imaging system 100 further includes a controller 190, as described in more detail above with respect to FIG. 1. The baseline adjustment mechanism 170 can include end region units 1001a and 1001b (shown in FIG. 10) for attachment of imaging devices 110a and 110b respectively thereto. The baseline adjustment mechanism 170 can enable the imaging devices 110a and 110b to move relative to the other. In one embodiment, one imaging device 110 can move while the other imaging device 110 does not move. In another embodiment, both imaging devices 110a and 110b can move. The relative movement of the imaging devices, as enabled by the baseline adjustment mechanism 170, can be along a single dimension or along more than one dimension. In some embodiments, the relative movement is along a single dimension. In another embodiment, the relative movement can be along multiple dimensions, such as for complex imaging applications.

For sake of clarity, the baseline b herein refers to the distance between a center (also referred to herein as an origin) of the first imaging device 110a and a center of the second imaging device 110b. Therefore, the minimum length of the baseline b in the present example may depend on the width of the imaging devices 110. Furthermore, the maximum length of the baseline b in the present example may depend on the length of the physical system onto which the baseline adjustment mechanism 170 is attached and/or the dimensions of the operating environment in which the imagine system 100 operates. The range of motion of the baseline adjustment mechanism 170 may further depend on a specific implementation of the baseline adjustment mechanism 170. In some exemplary embodiments, the adjustable range of the baseline b can be from about 3 centimeters to about 20 centimeters. In some exemplary embodiments, the baseline b can be in the adjustable range of 3 centimeters to 5 centimeters, 3 centimeters to 7 centimeters, 3 centimeters to 9 centimeters, 3 centimeters to 10 centimeters, 3 centimeters to 12 centimeters, 3 centimeters to 15 centimeters, 3 centimeters to 20 centimeters, 5 centimeters to 7 centimeters, 5 centimeters to 10 centimeters, 5 centimeters to 12 centimeters, 5 centimeters to 15 centimeters, 5 centimeters to 17 centimeters, 5 centimeters to 20 centimeters, 5 centimeters to 25 centimeters, 7 centimeters to 10 centimeters, 7 centimeters to 12 centimeters, 7 centimeters to 15 centimeters, 7 centimeters to 17 centimeters, 7 centimeters to 20 centimeters, 7 centimeters to 25 centimeters, 10 centimeters to 15 centimeters, 10 centimeters to 17 centimeters, 10 centimeters to 20 centimeters, 10 centimeters to 25 centimeters, or 10 centimeters to 30 centimeters. In yet other embodiments, the baseline b can be increased up to 30 centimeters, 35 centimeters, 40 centimeters, 50 centimeters, 60 centimeters, 70 centimeters, 80 centimeters, or more. In some embodiments, the baseline b can range from 5 centimeters to 15 centimeters.

Figure 3:
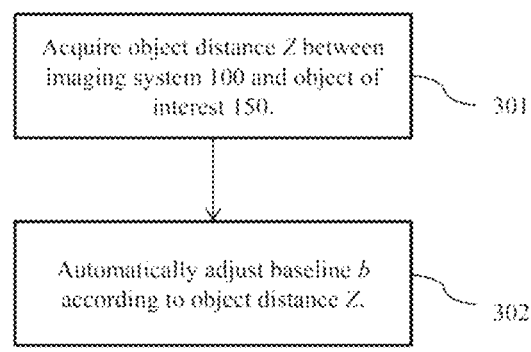
FIG. 3 is an exemplary top level diagram illustrating an embodiment of a method for automatically adjusting the baseline adjustment of the imaging system of FIG. 1.

Referring now to FIG. 3, one embodiment of a method 300 for automatically adjusting a baseline b of an imaging system 100 is illustrated. At 301, an object distance Z between the imaging system 100 and an object 150 of interest is acquired. The object distance Z can be acquired using any of several various methods, as desired. In some embodiments, the object distance Z can be acquired using a plurality of imaging devices 110 in the imaging system 100 via stereopsis. For example, two of the imaging devices 110 each can acquire an image 120 (shown in FIGS. 4-5) of the object 150 of interest, and overlapping portions of the acquired images 120 can be analyzed to assess the depth of the object 150 of interest. Alternative and/or, additionally, the object distance Z can be acquired using non-stereopsis methods, such as using a laser or using ultrasound. At 302, the baseline b is automatically adjusted according to the object distance Z.

Figure 4:
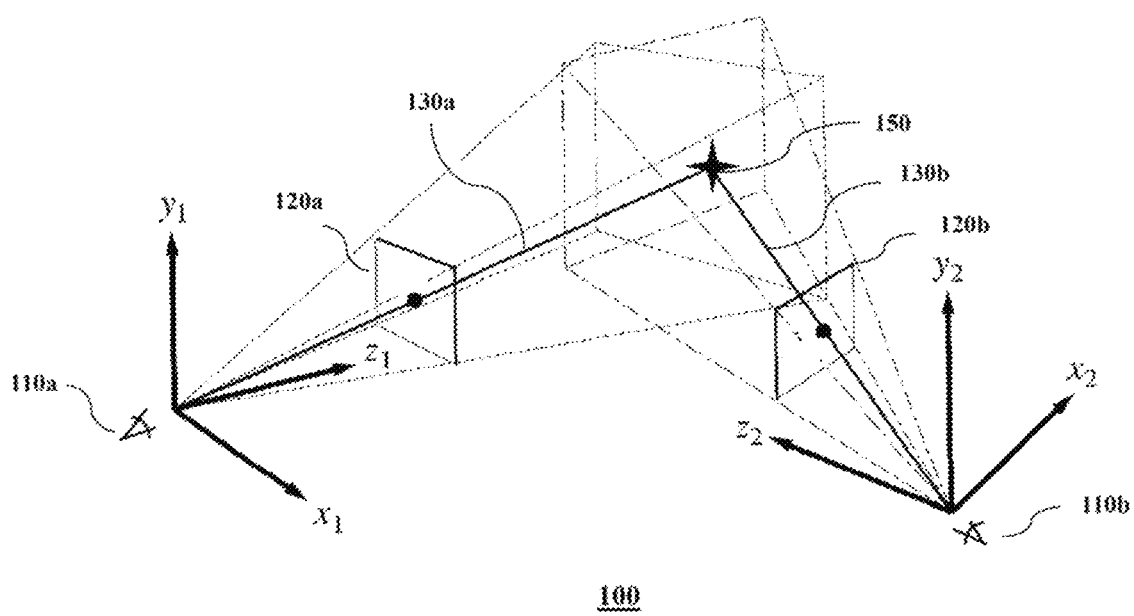
FIG. 4 is an exemplary diagram illustrating an alternative embodiment of the method of FIG. 3, wherein an object distance is determined using a plurality of imaging devices.

Referring now to FIG. 4, a method of ascertaining the object distance Z using stereoscopy is illustrated therein with reference to two imaging devices 110: a left imaging device 110a; and a right imagine device 110b. Each of the imaging devices 110a and 110b perceives the same object 150 of interest, but in different spatial coordinates as illustrated by the coordinate axes ($x_1$, $y_1$, $z_1$) and ($x_2$, $y_2$, $z_2$). The imaging devices 110a and 110b perceive the object 150 of interest along their respective optical axes 130a and 130b and thereby arrive at two different two-dimensional images 120a and 120b of the object 150 of interest. The two-dimensional images 120a and 120b are typically different, being taken from different positions, unless the imaging devices 110a and 110b are positioned such that their optical axes 130a and 130b coincide. Accordingly, under most circumstances, a binocular disparity d (represented, for example, in Equation (4)) can be found between the images 120a and 120b, as described below with reference to FIG. 5.

Figure 5:
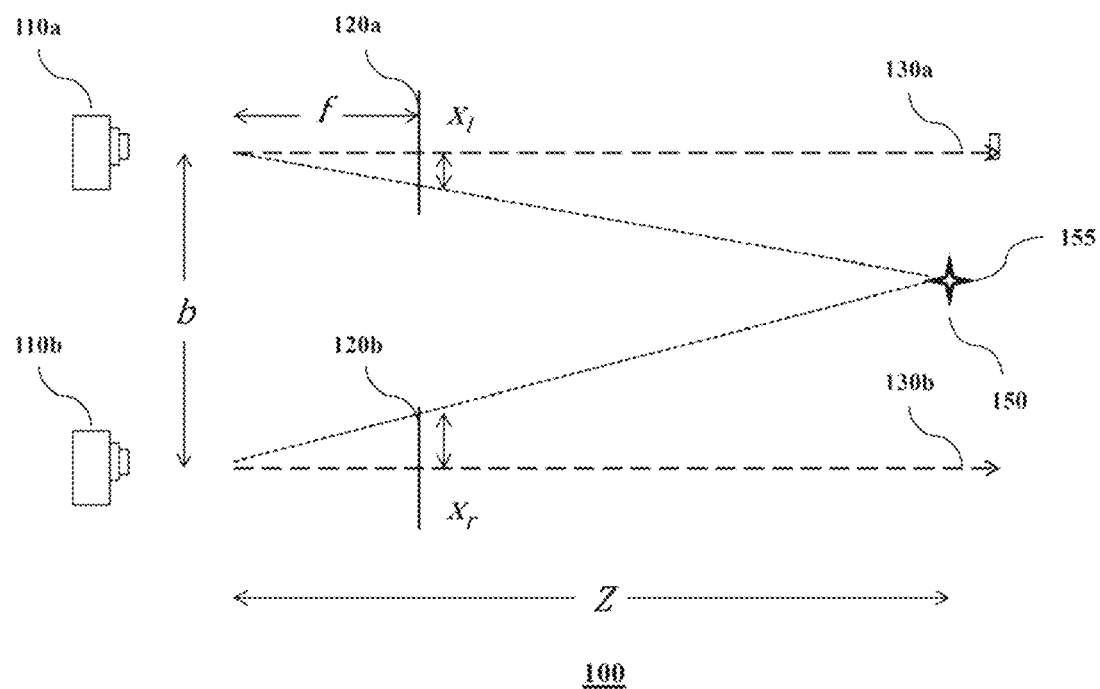
FIG. 5 is an exemplary diagram illustrating another alternative embodiment of the method of FIG. 4, wherein object distance is determined triangulation.

Referring now to FIG. 5, two-dimensional images 120a and 120b can be compared to ascertain the object distance between a pair of imaging devices 110a and 110b (or equivalently, the imaging system 100) and the object 150 of interest. A method of triangulation can be used to ascertain the object distance Z using a binocular disparity d between the images 120a and 120b. Specifically, the position of an object 150 of interest having an index i, represented by its coordinates ($X_i$, $Y_i$, $Z_i$), can be given as follows:

$$X_i = \frac{b}{d}(x_i^l - c_x),\quad \text{Equation (1)}$$

$$Y_i = \frac{b}{d}(Y_i^l - c_y),\quad \text{Equation (2)}$$

$$Z_i = \frac{b}{d}f \quad \text{Equation (3)}$$

Where $c_x$ and $c_y$ represent respective center coordinates of the imaging devices 110a and 110b, $x_i$ and $y_i$ represent the coordinates of the object 150 of interest in one or both of the images 120a and 120b, b is the baseline (in other words, the distance between the center coordinates of the imaging devices 110a and 110b), f is the focal length of each imaging devices 110a and 110b (assuming here that the imaging devices have the same focal length), i is an index over multiple objects of interest 150 or over multiple feature points 155 of all object 150 of interest, and d is the binocular disparity between the images 120a and 120b, represented here as:

$$d_i = x_i^l - x_i^r. \quad \text{Equation (4)}$$

Figure 6:
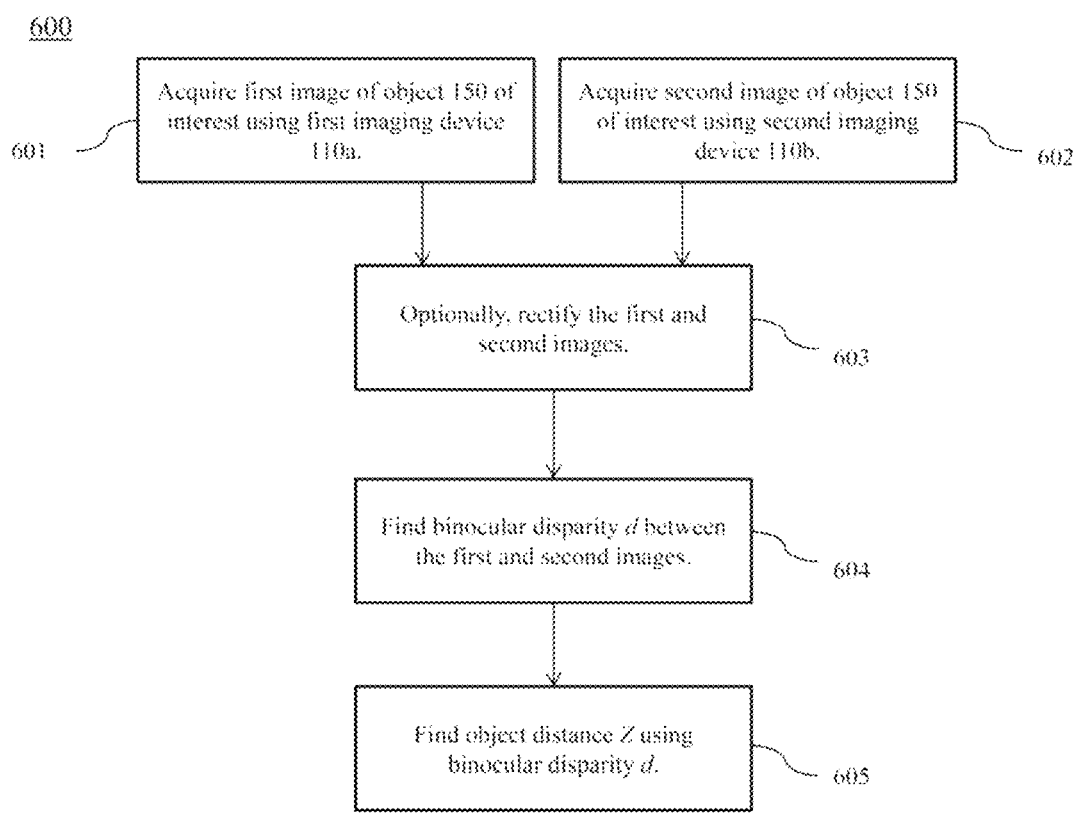
FIG. 6 is an exemplary diagram illustrating another alternative embodiment of the method of FIG. 3, wherein an object distance is determined using a binocular disparity.

Based on the above principles, and turning now to FIG. 6, an exemplary embodiment of a method 600 for acquiring the object distance Z using a first imaging device 110a and a second imaging device 110b based on stereopsis is illustrated. At 601, a first image 120a (shown in FIGS. 4 and 5) of the object 150 of interest is acquired using the first imaging device 110a. At 602, a second image 120b (shown in FIGS. 4 and 5) of the object 150 of interest is acquired using the second imaging device 110b. The first and second images 120a, 120b can be acquired either simultaneously or successively, as desired. In some embodiments, the first and second images 120a, 120b can be acquired simultaneously to reduce error attributable to shifts of the objects of interest 150 and/or the imaging system 100 over time.

At 603, the first and second images 120a, 120b of the object 150 of interest can optionally be rectified prior to determining a binocular disparity d. That is, the images 120a, 120b can be corrected to remove distortion by, for example, putting the images 120a, 120b on the same, plane by rotation, scaling the images 120a, 120b to make the images 120a, 120b the same size, and adjusting for skew so that corresponding pixels the images 120a, 120b line up. The rectification can be performed based on a set of extrinsic parameters that convey the translational and rotational relationship between two imaging devices 110. The extrinsic parameters can be stored, for example in a memory (not shown) of the imaging system 100.

At 604, a binocular disparity d is found between the first image 120a and the second image 120b. For example, the binocular disparity d can be found for a particular object 150 of interest based on the position of the object 150 of interest in the first image 120a and the position of the object 150 of interest in the second image 120b. Determining the position of an object 150 of interest in a selected image 120 can be done in any suitable manner and can be based on various settings (for example, close-up, mid-distance, far, people, landscape, or the like). The object of interest 150 can be identified based on, e.g., machine vision and/or artificial intelligence methods. Suitable methods include feature detection, extraction and/or matching techniques such as RANSAC (RANdom SAmple Consensus), Shi & Tomasi corner detection, SURF blob (Speeded Up Robust Features) detection, MSER blob (Maximally Stable Extremal Regions) detection, SURF (Speeded Up Robust Features) descriptors, SIFT (Scale-Invariant Feature Transform) descriptors, FREAK (Fast REtinA Keypoint) descriptors, BRISK (Binary Robust Invariant Scalable Keypoints) descriptors, HOG (Histogram of Oriented Gradients) descriptors, or the like. Similarly, these methods can be used to identify one or more feature points 155 (shown in FIG. 5) within the object 150 of interest.

In some embodiments, the object 150 of interest can include an entire field-of-vision of an imaging device 110. For example, a selected imaging device 110 may be so close to the object 150 of interest that the object 150 of interest fills the entire field-of-view of the imaging device 110. As another example, the object 150 of interest may be a composite (for example, a landscape) of many individual objects within the field-of-vision of the imaging device 110, and focusing on individual objects within the composite is not needed. In such cases, each pixel of an image of the composite can be considered as a separate feature point 155, and the object distance Z can be found based on the feature points 155 or pixels. In some embodiments, the object 150 of interest can include a portion of the field-of-vision of an imaging device 110. For example, the center of the field-of-vision (or example, the center 10 percent, 20 percent, 30 percent, 40 percent, 50 percent 60 percent, 70 percent, 80 percent, or 90 percent of the pixels in the field-of-vision) can be designated as the object 150 of interest. In some embodiments, the object 150 of interest can include all or a portion of an overlapping region between the first image 120a acquired by the first imaging device 110a and the second image 120b acquired by the second imaging device 110b.

At 605, the object distance Z is found using the binocular disparity d. For example, the object distance Z can be found as a function of the binocular disparity d, the baseline b between the first and second imaging devices 110a and 110b, and a focal length f of at least one of the first and second imaging devices 110a and 110b using Equations (1)-(4). In some embodiments, the first and second imaging devices 110a and 110b have the same focal length f.

Figure 7:
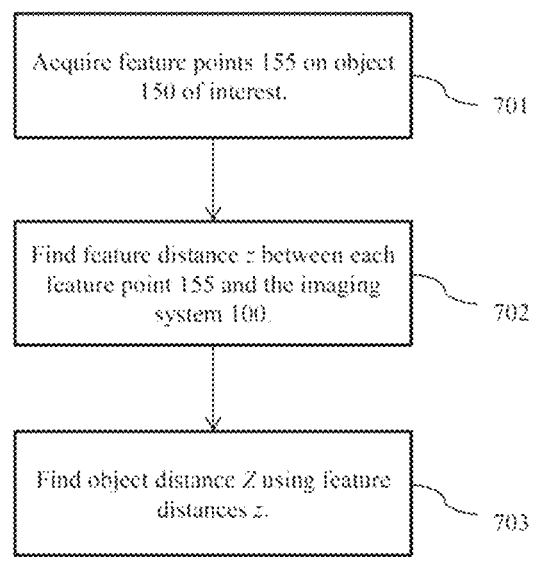
FIG. 7 is an exemplary diagram illustrating another alternative embodiment of the method of FIG. 3, wherein an object distance is determined using a plurality of feature points.

Turning now to FIG. 7, an exemplary embodiment of as method 700 for acquiring an object distance fusing feature points 155 of an object 150 of interest is illustrated. At 701, a plurality of feature points 155 on the object 150 of interest is acquired. The feature points 155 can be acquired using a variety of different methods. In one exemplary embodiment, the feature points 155 are identified as pre-defined shapes the object 150 of interest. In another embodiment, the feature points 155 are recognized as one or more portions of the object 150 of interest having a particular color or intensity. In another embodiment, the feature points 155 are selected as random portions of the object 150 of interest. In another embodiment, the feature points 155 are selected at regularly spaced intervals on the object 150 of interest, for example, every pixel, every other pixel, every third pixel, every fourth pixel, and so forth. The feature points 155 can take varying shapes, and sizes, as desired. In some embodiments, a combination of methods described above can be used to select the feature points 155.

At 702, a feature distance z between each feature point 155 and the imaging system 100 is found. Each feature distance z can be found in any suitable manner, including by using a binocular disparity d between the position of the feature point 155 in a first image 120a (shown in FIGS. 4 and 5) acquired by a first imaging device 110a (shown in FIGS. 4 and 5) and the position of the feature point 155 in a second image 120b (shown in FIGS. 4 and 5) acquired by a second imaging device 110b (shown in FIGS. 4 and 5). Using the binocular disparity d, the feature distance z can be found via Equations (1)-(4) in a similar manner as an object distance Z, as described above with reference to FIGS. 3-6.

At 703, the object distance Z is found using the feature distances z found at 702. Any of a variety of methods can be used to determine the object distance Z based on individual feature distances z of the object 150 of interest. In one embodiment, the object distance Z is found based on an average of the filature distances z. Exemplary types of averages can include an arithmetic mean, a geometric mean, a median, or a mode. In another embodiment, the object distance Z is found by selecting one or more of the feature points 155 and acquiring the object distance Z based on the features distances z of the selected feature points 155. Computing the object distance from a selected subset of feature points 155 can, for example, allow filtering out of noise, filtering out of feature points 155 that are too far (or too close), or filtering out of feature points 155 based on intensity or color. For example, the feature points 155 that are too far away from the imaging system 100 may be prone to errors in estimating the object distance Z. Thus, in one embodiment, a predetermined percentage of feature points 155 that are closest to the imaging system 100 can be selected, and the remaining feature points 155 filtered out for purposes of determining the object distance Z. In some embodiments, the percentage of feature points 155 that are selected is 10 percent, 20 percent, 30 percent, 40 percent, 50 percent, 60 percent, 70 percent, 80 percent, or 90 percent. In some embodiments, 80 percent of the feature points 155 are selected. In some other embodiments, the feature points 155 are pixels in an image, and 80 percent of the pixels are selected for determining the object distance Z. After filtering out undesirable feature points 155, the selected (or, in other words, the remaining) feature point 155 that is the farthest away from the imaging system 100 can be used to determine the object distance Z. Stated somewhat differently, the object distance Z is the feature distance z of the selected feature point 155 that is farthest from the imaging system 100.

Figure 8:
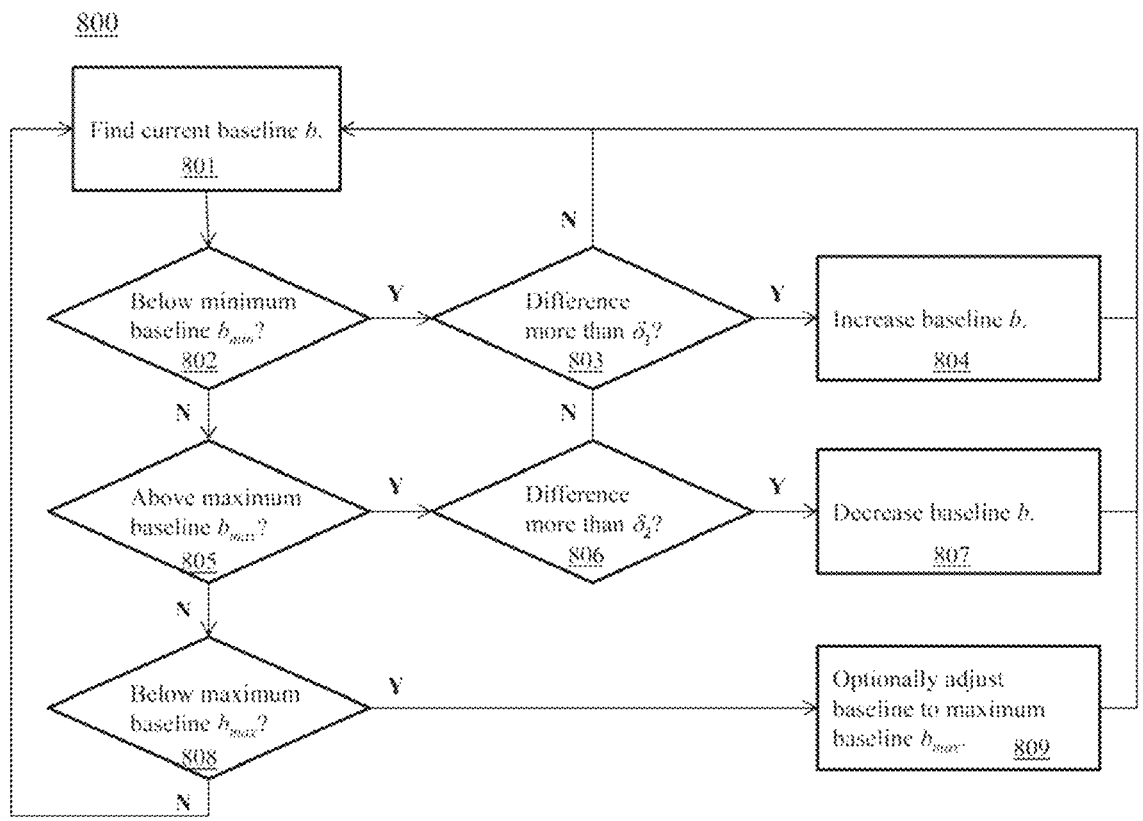
FIG. 8 is an exemplary flow chart illustrating another alternative embodiment of the method of FIG. 3, wherein a baseline is adjusted based on an object distance.

Turning now to FIG. 8, an exemplary embodiment of a method 800 for automatically adjusting a baseline b according to an object distance Z is illustrated. The method 800 utilizes a minimum baseline $b_{min}$ and a maximum baseline $b_{max}$, which define an exemplary range of values for the baseline b. In some embodiments, one or both of $b_{min}$ and $b_{max}$ can be a function of the object distance Z. In some embodiments, one or both of $b_{min}$ and $b_{max}$ can be independent of the object distance Z.

At 801, the baseline b (or, in other words, a current value of the baseline b) of the imaging system 100 is found. For example, the baseline b can be an internal parameter that is kept track of by a controller 190 (shown in FIG. 1) and/or stored in a memory (not shown). Alternatively and/or additionally, the baseline b can be found based on a physical position of a baseline adjustment mechanism 170 (shown in FIG. 2-3) and/or one or more components thereof. After the baseline b is found, the baseline b can be compared to the minimum baseline $b_{min}$ and a maximum baseline $b_{max}$ to determine whether baseline adjustment is to be performed.

At 802, the baseline b is compared with the minimum baseline $b_{min}$. If the baseline b is greater than or equal to the minimum baseline $b_{min}$, then it is determined whether the baseline b is greater than the maximum baseline $b_{max}$, at 805. If the baseline b is less than the minimum baseline $b_{min}$, then it is optionally further determined, at 803, whether the difference between the baseline b and the minimum baseline $b_{min}$ is greater than a first tolerance $\delta_1$. If the difference between the baseline b and the minimum baseline $b_{min}$ is greater than the first tolerance $\delta_1$, the baseline b can be increased at 804. If the difference between the baseline b and the minimum baseline $b_{min}$ is less than or equal to the first tolerance $\delta_1$, then the baseline b of the imaging system 100 is found, at 801. The first tolerance $\delta_1$ may or may not be dependent on (for example, as a fraction of) the baseline b and/or the minimum baseline $b_{min}$.

At 805, it is determined whether the baseline b is greater than the maximum baseline $b_{max}$. If the baseline b is less than or equal to the maximum baseline $b_{max}$, then it is determined whether the baseline b is less than the maximum baseline $b_{max}$, at 808. If the baseline b is greater than the maximum baseline $b_{max}$, then we optionally proceed to 806, where it is optionally further determined whether the difference between the baseline b and the maximum baseline $b_{max}$ is greater than a second tolerance $\delta_2$. If the difference between the baseline b and the maximum baseline $b_{max}$ is greater than the second tolerance $\delta_2$, the baseline b can be decreased at 807. If the difference between the baseline b and the maximum baseline $b_{max}$ is less than or equal to the second tolerance $\delta_2$, then the baseline b of the imaging system 100 is found, at 801. The second tolerance $\delta_2$ may or may not, be dependent on (for example, a fraction of) the baseline b and/or the maximum baseline $b_{max}$. In some embodiments, the tolerances $\delta_1$ and/or $\delta_2$ can be configured so as to balance baseline adjustment with minimizing disruption of imaging.

At 808, it is determined whether the baseline b is, less than the maximum baseline $b_{max}$. If so, then, at 809, the baseline b can optionally be increased until the baseline b reaches the maximum baseline $b_{max}$. By increasing the baseline b, at 809, i.e., by setting the baseline b to the maximum baseline $b_{max}$, objects of interest 150 can be resolved with the least amount of error.

The minimum baseline $b_{min}$ can be set, for example, based on the fact that resolving distant objects becomes more and more difficult as the baseline b is decreased. By triangulation, and in accordance with Equation (3) given above, the object distance Z is directly proportional to the baseline b and inversely proportion to the binocular disparity d. Hence, the resolution by which the binocular disparity d can be measured may constrain the accuracy of measuring the object distance Z. For example, for a digital imaging system having digital imaging devices 110, the resolution of the binocular disparity d can depend on the resolutions of the imaging devices 110. A positional shift in an image 120 that is less than the length L of one pixel is difficult to detect by the digital imaging device 110. Thus, the position of an object in a digital image can have an error up to the length L of one pixel. As the binocular disparity d is found here using two images, the cumulative error in the binocular disparity d can be up to 2 L, (in other words, two pixels in length). For greater precision, the minimum baseline $b_{min}$ can therefore be set as the value that would give a binocular disparity d that is at least a predetermined number, such as 1, 2, 3, 4, 5, 6, 7, 8, 9, 10, or more, pixels lengths for the given object distance Z. In some embodiments, the minimum baseline $b_{min}$ is set so that the binocular disparity d is at least four pixel lengths for the given object distance Z. Stated somewhat differently, the minimum baseline $b_{min}$ can be set at 4*Z*L/f, where Z is the object distance, L is a pixel width of at least one of the imaging devices 110, and f is a focal distance of at least one of the imaging devices 110. In some embodiments, the first and second imaging devices 110a and 110b of the imaging system 100 can have the same focal distance f and/or the same pixel width L.

The maximum baseline $b_{max}$ can be set, for example, based on the fact the overlapping region between images 120 acquired by two imaging devices 110 may be too small when the baseline b is too large. Thus, the maximum baseline $b_{max}$ can be based on maintaining an overlap between the images above a threshold value, for example, of at least 10 percent, 20 percent, 30 percent, 40 percent, 50 percent, 60 percent 70 percent, 80 percent, 90 percent. In some embodiments, the threshold value can be set to 50 percent. In some embodiments, the automatically adjusting includes increasing the baseline b until the overlap reaches the threshold value, for example, 50 percent. Expressed mathematically, the maximum baseline $b_{max}$ can be set at Z*tan(θ/2), where Z is the object distance and θ is an angle-of-view of at least one of the imaging devices 110. In some embodiments, the first and second imaging devices 110a and 110b of the imaging system 100 have the same angle-of-view θ.

In embodiments where the imaging system is a mobile platform, such as a UAV 200 (shown is FIGS. 11-13), and/or where the imaging system 100 is mounted aboard the mobile platform the baseline adjustment can take into account an operational mode of the mobile platform. If the mobile platform is a UAV 200 for example, the operational mode can include a flight mode of the UAV 200. For example, the baseline b can be decreased when the flight mode is a landing mode since the UAV 200 may benefit from close-up imaging of an area underneath the UAV 200 during landing. Similarly, the baseline b can be increased when the flight mode is a takeoff mode since the UAV 200 may benefit from a better view of the surroundings of the UAV 200 during takeoff. Alternatively and/or additionally, the baseline b can be increased when the flight mode is an aerial image acquisition mode to see farther during aerial imaging.

Figure 9:
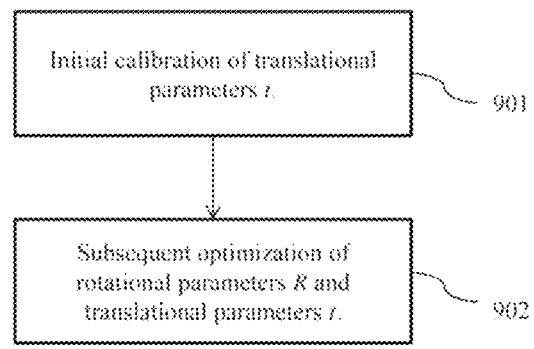
FIG. 9 is an exemplary diagram illustrating another alternative embodiment of the method of FIG. 3, wherein extrinsic parameters are calibrated after baseline adjustment.

Turning now to FIG. 9, an embodiment of a method 900 of calibrating extrinsic parameters of an imaging system 100 after automatic adjustment of the baseline b. Extrinsic parameters include, for example, a three-by-three rotational matrix R and a three-dimensional translational vector t. Stated somewhat differently, the extrinsic parameters can include a plurality of rotational parameters encapsulated by the rotational matrix R and a plurality of translational parameters encapsulated by the translational vector t. The extrinsic parameters can define the relative positions of the imaging devices 110, enabling the three-dimensional imaging of an object 150 of interest using stereopsis. In some embodiments, the rotational matrix R can be an orthogonal matrix or an orthonormal matrix. For example, the rotational matrix R may satisfy that $RR^T=I$ and that $R^TR=I$. In some embodiments, the rotational matrix R can have a dimensionality other than three-by-three (for example, a homogeneous matrix). In some embodiments, the translational vector t can have a dimensionality other than three.

After the baseline b of the imaging system 100 is adjusted, the extrinsic parameters may become obsolete and may benefit from calibration (or recalibration). Typically, a baseline adjustment will result in relatively little change in the rotational orientations of the imaging devices 110 relative to an object of interest, assuming that the object distance Z is much greater than the baseline b. Accordingly, in some embodiments, the extrinsic parameters can be calibrated using a two-step process. At 901, the translational parameters t are initially calibrated based on the automatic adjustment of the baseline b. Stated somewhat differently, the extrinsic parameters after the initial adjustment are $R_0$ and $\lambda t_0$, where $R_0$ and $t_0$ are pre-adjustment extrinsic parameters and λ is a constant that reflects the amount of initial adjustment to $t_0$.

For example, where the baseline adjustment mechanism 170 of the imaging system 100 includes a screw shaft mechanism 1000 (shown in FIG. 10), the initial calibration of the translational parameters t can be based on a degree of rotation of the screw shaft mechanism 1000 during the baseline adjustment. The amount of baseline adjustment can be further based on a radius and a groove pitch of screw shafts 1002a and 1002b (shown in FIG. 10). Similar methods can be used to find the initial calibration of the translational parameters t for other baseline adjustment mechanisms such as rack and pinion mechanisms, slider and crank mechanisms, linear motors, or the like.

At 902, after the initial calibration, the extrinsic parameters of R and t can be further calibrated for optimization. A variety of optimization methods can be used to further calibrate the extrinsic parameters. Exemplary algorithms suitable for optimization include linear programming, interpolation, memetic algorithms, differential evolution, evolutionary algorithms, genetic algorithms, dynamic relaxation, hill-climbing algorithms, random-restart algorithms, simulated annealing, gradient descent, and the like. In some embodiments, the further calibration uses a bundle adjustment optimization method, as illustrated below. For example, the bundle adjustment optimization method can proceed by minimizing the value of the following fitness function:

$$\min_{P^l, P^r} \sum_{i=1}^{N} [(x_i^l - P^l X_i)^2 + (x_i^r - P^r X_i)^2]. \quad \text{Equation (5)}$$

Here $P^l$ and $P^r$ represent projection matrices of a first imaging device 110a and a second imaging device 110b, (shown in FIGS. 4-5), respectively, $x^l$ and $x^r$ are positions of the first imaging device 110a and a second imaging device 110b, respectively, X is the position of the object of interest, and i is an index over multiple objects of interest 150 (shown in FIGS. 4-5) or over feature points 155 (shown in FIG. 5). The projection matrices $P^l$ and $P^r$ can encapsulate the extrinsic parameters R and t through the following relations:

$$p^l = K^l[I\ 0],\qquad \text{Equation (6)}$$

$$p^r = K^r[R\ t],\qquad \text{Equation (7)}$$

Where $K^l$ and $K^r$ are parameters intrinsic to the first imaging device 110a and a second imaging device 110b (shown in FIGS. 4-5), respectively and may be determined, for example, from factory settings of the imaging devices. Accordingly, once the optimal values of $P^l$ and $P^r$ are found through minimizing the fitness function of equation (5), the extrinsic parameters R and l can be found using equation (6) and (7) based on the intrinsic parameters $K^l$ and $K^r$.

The methods described above with respect to FIGS. 3-9 can be implemented as a computer program product (not shown) that includes instructions for automatically adjusting a baseline of an imaging system 100 having a first imaging device 110a and a second imaging device 110b. The instructions of the computer program product can be stored on a controller 190 (shown in FIG. 1), for example, on a memory. The instructions can be executed, for example, on a processor (not shown) of the controller 190. Control signals can be generated by the controller based, for example, on an object distance Z between the imaging system 100 and an object of interest 150, and any baseline adjustment based on the object distance Z. The control signals can be output to a baseline adjustment mechanism 170 (shown in FIG. 2), as desired, to effectuate baseline adjustment according to the instructions of the controller.

Figure 10:
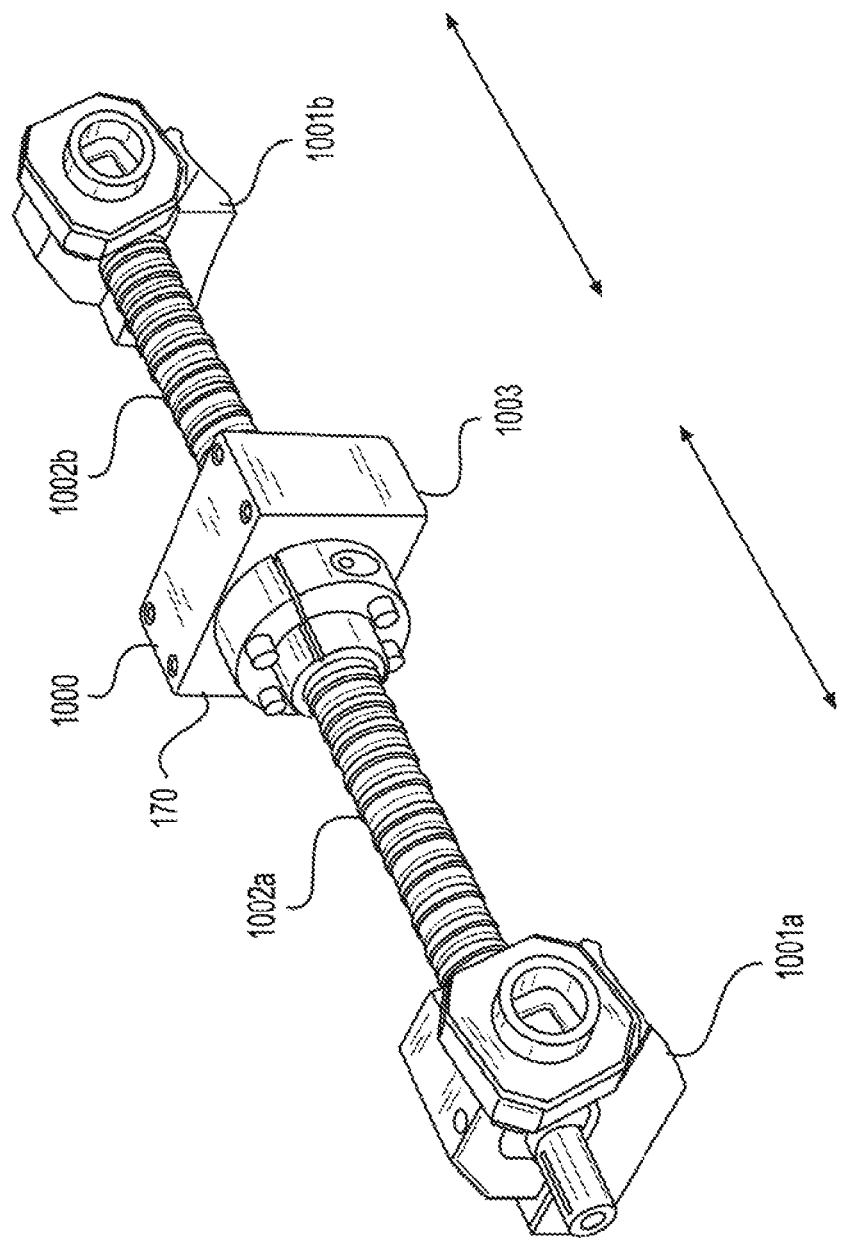
FIG. 10 is a detail diagram of an embodiment of the baseline adjustment mechanism. of FIG. 2, wherein the baseline adjustment mechanism includes a screw shaft mechanism.

Turning now to FIG. 10, an exemplary baseline adjustment mechanism 170 is shown as comprising a screw shaft mechanism 1000. The screw shaft mechanism 1000 includes screw shafts 1002a and 1002b, a central housing 1003 rotatably coupled with the screw shafts 1002a and 1002b, and end region units 1001a and 1001a mutably sleeved on the screw shafts 1002a and 1002b, respectively. Each end region unit 1001a and 1001b can be configured to be coupled to an imaging device 110 (not shown in FIG. 10). The screw shafts 1002a and 1002b can rotate independently of one another via an actuator (not shown), such as, for example, a stepper motor, causing the end region units 1001a and 1001b to move linearly with respect to one another. In some embodiments, each end region unit 1001a and 1001b can include a plurality of ball bearings (not shown) disposed within to reduce friction with the screw shafts 1002a and 1002b. By using the screw shaft mechanism 1000 for baseline adjustment, rotational motion of the screw shafts 1002a and 1002b can be precisely translated into translational motion of the end region units 1001a and 1001b, resulting in a fine-tuning of the baseline b (shown in FIG. 2). Further, by using the screw shall mechanism 1000 for baseline adjustment, the degree of linear motion is directly proportional to the degree of rotational motion, allowing precise extrapolation of the amount of baseline adjustment based on, for example, a radius and a groove pitch of the screw shafts 1002a and 1002b.

Alternatively and/or additionally, the baseline adjustment mechanism 170 can include a mechanism for converting rotary to linear motion, for example, a slide and crank mechanism, a rack and pinion, mechanism, a linear motor, or the like. The baseline adjustment mechanism 170 can further include additional components for facilitating and/or effectuating linear or non-linear motion of the imaging devices 110, including but not limited to, for example, rail systems and runner blocks, end bearing supports, ball screws, slide bushes, slide screws, conveyer belts, pulleys, or the like.

The baseline adjustment mechanism 170 can be affixed any supporting structure (not shown) of an imaging system 100, as desired. Furthermore, while the baseline adjustment mechanism 170 is depicted as single unit in FIG. 10 for illustrative purposes only, the baseline adjustment mechanism 170 need not be constrained as such. In some embodiments, the baseline adjustment mechanism 170 can include multiple units (for example, separate screw shaft, rack and pinion, and/or slide and crank mechanisms) that are separately affixed to portions of the imaging system 100. In some embodiments, each imaging device 110 can be affixed to an independently mobile unit of the baseline adjustment mechanism 170. The baseline adjustment mechanism 170 can be positioned on different portions of the imaging system 100, as desired. Where the baseline adjustment mechanism 170 is implemented as a single unit, rotation of the baseline adjustment mechanism 170 may allow imaging devices 110 affixed thereto to rotate together, which may allow coordination between the imaging devices 110. Even if the imaging devices 110 are separately affixed to independently mobile units of the baseline adjustment mechanism 170, the rotation of the imaging devices 110 can be coordinated (e.g., by a controller 190, shown in FIG. 1).

Figure 11:
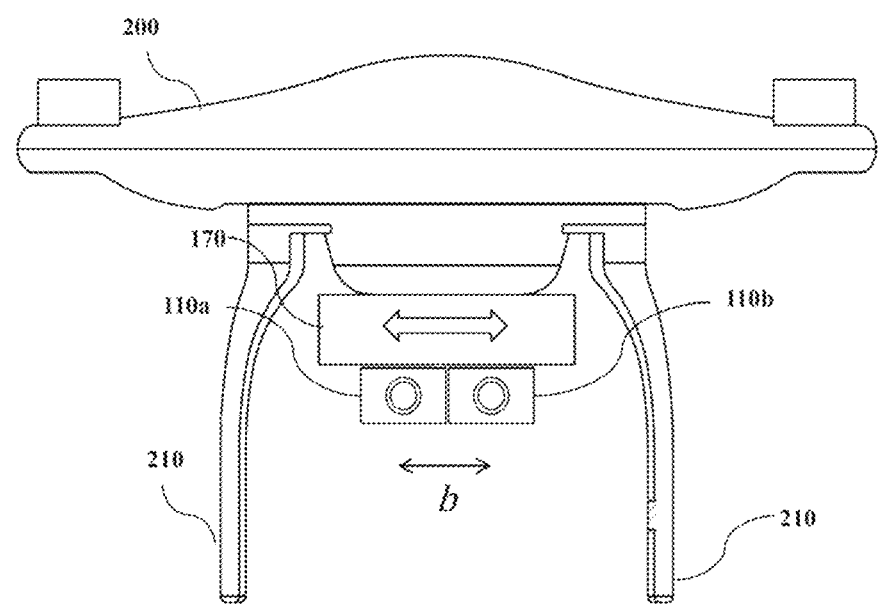
FIG. 11 is at exemplary diagram illustrating an embodiment of the imaging system of FIG. 1, wherein the imaging system is mounted aboard an unmanned aerial vehicle (UAV).
Figure 12:
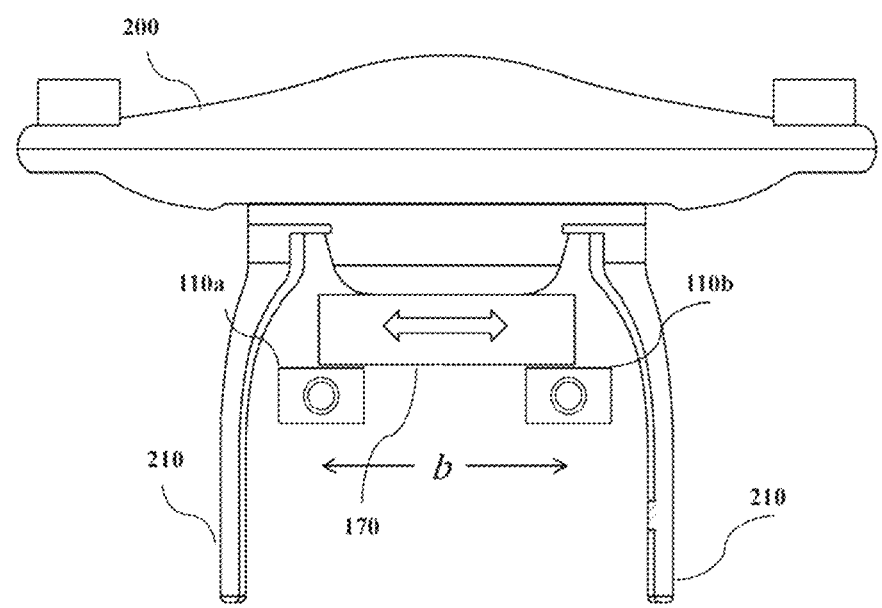
FIG. 12 is an exemplary diagram illustrating the imaging system of FIG. 11, wherein a baseline of the imaging system has been adjusted.
Figure 13:
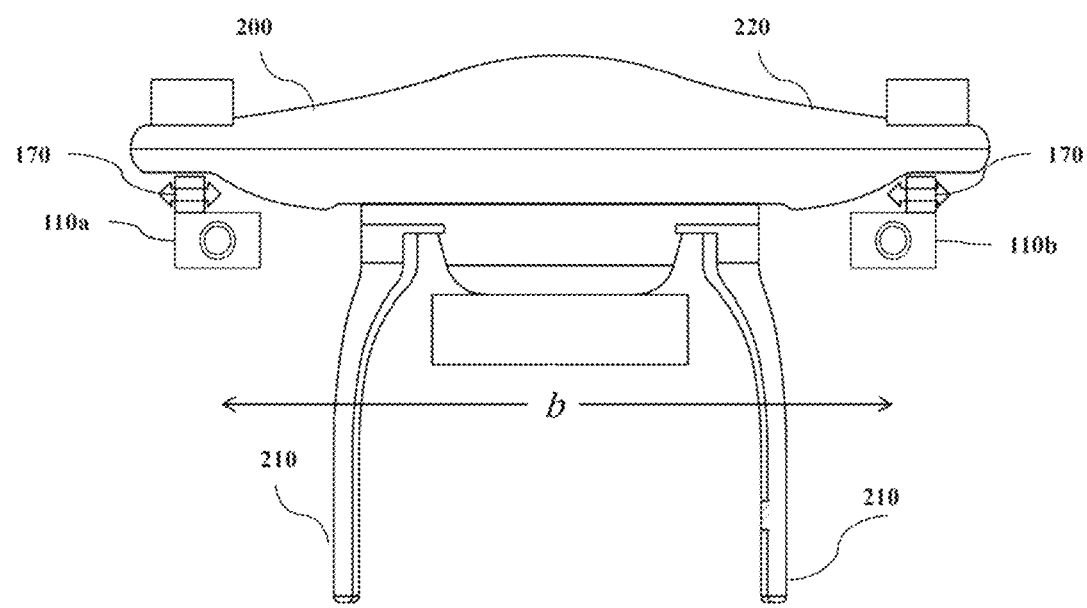
FIG. 13 is an exemplary diagram illustrating an alternative embodiment of the imaging system of FIG. 11, wherein the imaging system is mounted on a fuselage of the UAV.

In FIGS. 11-13, exemplary embodiments of the imaging system 100 are shown in which the imaging system 100 is a mobile platform, such as an unmanned aerial vehicle (UAV) 200. Stated somewhat differently, the imaging system 100 can be mounted on the mobile platform, such as the UAV 200. Imaging devices 110 are shown in FIGS. 11-13 as being mounted on the UAV 200 in different configurations.

UAVs 200, colloquially referred to as "drones," are aircraft without a human pilot onboard the vehicle whose flight is controlled autonomously or by a remote pilot (or sometimes both). UAVs are now finding increased usage in civilian applications that require various forms of aerial data-gathering. Various types of UAVs 200 are suitable for use as imaging systems 100. One suitable type of UAV 200, for example, is an aerial rotorcraft that is propelled by multiple rotors. One suitable type of rotorcraft has four rotors and is known as a quadcopter, quadrotor helicopter, or quad rotor. Exemplary quadcopters suitable for the present systems, and methods for imaging (for example, stereoscopic imaging) include numerous models currently available commercially. UAVs 200 suitable for the present systems and methods further include, but are not limited to, other rotor designs such as single rotor, dual rotor, trirotor, hexarotor, and octorotor designs. Fixed wing UAVs 200 and hybrid rotorcraft-fixed wing UAVs 200 can also be used.

Turning now to FIG. 11, an exemplary imaging system 100 is shown as a UAV 200 having a left (or port) imaging device 110a and right (or starboard) imaging device 110b affixed thereto. Various imaging devices 110 are suitable for use on a UAV 200, while the imaging devices 110 can be light and compact. In the example of FIG. 11, the imaging devices 110a and 110b are affixed to the underside of the UAV 200 via a baseline adjustment mechanism 170. Such a configuration can be relatively unobtrusive to the flight operations of the UAV 200. Furthermore, positioning the imaging devices 110a and 110b on the underside of the UAV 200 can enable imaging of an area directly below the UAV 200, which may facilitate landing and/or other aerial surveillance. The baseline adjustment mechanism 170 can be a single unit that is affixed to the UAV 200 or multiple units that are independently affixed to the UAV 200. The baseline b is shown as the distance between the centers of the left and right imaging devices 110a and 110b. In this example, the left and right imaging devices 110a and 110b are physically abutting, and thus a minimum value of the baseline b has been reached.

In this example, based on control signals from a controller 190 (shown in FIG. 1), the baseline adjustment mechanism 170 can expand the baseline b to a desired value, up to a maximum value based on the physical configuration of the UAV 200. An exemplary embodiment of the baseline b reaching a maximum value is shown in FIG. 12 with respect to the embodiment of FIG. 11. In the present example, the ability to increase the baseline b may further depend on additional components of the UAV 200, such as landing gears 210 positioned on lateral flanks of the UAV 200. In this example, the landing gear 210 may block the field-of-vision of the imaging devices 110a and 110b and/or physically prevent the imaging devices 110a and 110b from moving past a certain point. Thus, in some embodiments, the landing gear 210 can be retractable or be automatically moved out of the way.

Turning now to FIG. 13, another exemplary imaging system 100 is shown as a UAV 200 having a left imaging device 110a and right imaging device 110b affixed to the flanks of a body (or fuselage) 220 of the UAV 200. In this example, the imaging devices 110a and 110b are independently mounted to the UAV 200 via separate units of the baseline adjustment mechanism 170. As such, the baseline b can take a larger value, as shown, and the fields-of-vision of the imaging devices 110a and 110b are not obstructed by the landing gears 210.

Figure 14:
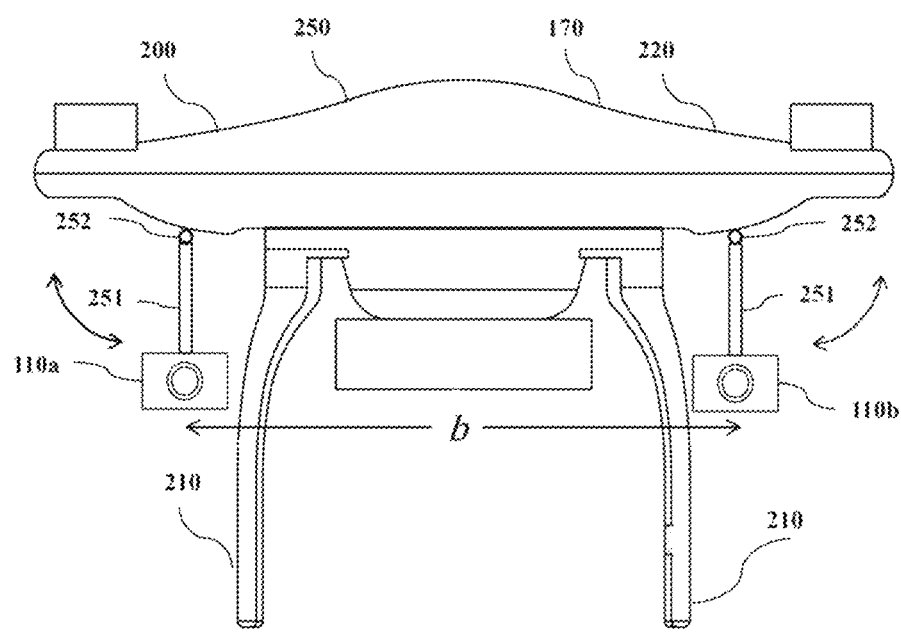
FIG. 14 is an exemplary diagram illustrating the imaging system of FIG. 11, wherein imaging devices are attached to an adjustable frame.
Figure 15:
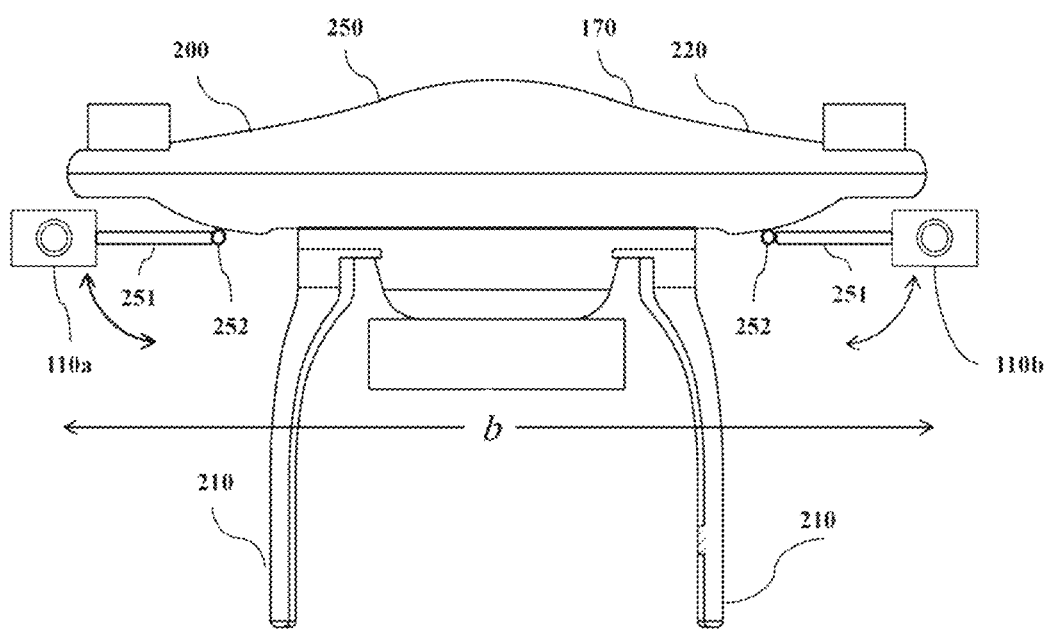
FIG. 15 is an exemplary diagram illustrating an alternative embodiment of the imaging system of FIG. 14, wherein a baseline of the imaging system has been adjusted.

Turning now to FIG. 14, another exemplary imaging system 100 is shown as a UAV 200 having a left imaging device 110a and right imaging device 110b affixed to an adjustable frame 250 of the UAV 200. Stated somewhat differently, the baseline adjustment mechanism 170 is, or can be, a portion of, the adjustable frame 250. The adjustable frame 250 can include rate or more adjustable members 251 adjustably attached to a fuselage 220 of the UAV 200. As non-limiting example, each of the adjustable members 251 can be configured to pivot with respect to an attachment point 252. In one embodiment, the attachment point 252 is arranged at the fuselage 220. The left imaging device 110a and right imaging device 110b can be affixed to distal ends of the adjustable members 251, respectively. FIG. 14 shows the adjustable members 251 in a compact configuration. Adjusting the position of the adjustable members 251 (for example, by pivoting about one or more attachment points 252) results in increasing the baseline b between the imaging devices 110a and 110b so as to reach an extended configuration shown in FIG. 15. Similarly, by folding the adjustable members 251 into the compact configuration shown in FIG. 14, the baseline b can be decreased, as desired.

In this example, the imaging devices 110a and 110b are independently mounted to the UAV 200 via separate units of the baseline adjustment mechanism 170. As such, the baseline b can take a larger value, as shown, and the fields-of-vision of the imaging devices 110a and 110b are not obstructed by the landing gears 210.

In embodiments where the imaging system 100 is a UAV 200 (or, equivalently, where an imaging system 100 is mounted on a UAV 200), the controller 190 can be configured to perform baseline adjustment depending on a flight mode of the UAV. For example, the controller 190 can be configured to decrease the baseline b when the flight mode is a landing mode. Alternatively and/or additionally, the controller 190 can be configured to increase the baseline b when the flight mode is a takeoff mode. Alternatively and/or additionally, the controller 190 can be configured to increase the baseline b when the flight mode is an aerial image acquisition mode.

While the imaging devices 110 are illustrated in FIGS. 11-15 as being symmetrically positioned with respect to the UAV 200, the imaging devices 110 need not be symmetrically positioned. In some embodiments, the imaging devices 110 are asymmetrically positioned. Furthermore, although shown and described with respect to UAV 200 for purposes of illustration only, the imaging system 100 can be, or can be mounted on, any type of mobile platform. Exemplary suitable mobile platforms include, but are not limited to, bicycles, automobiles, trucks, ships, boats, trains, helicopters, aircraft, various hybrids thereof, or the like.

Figure 16:
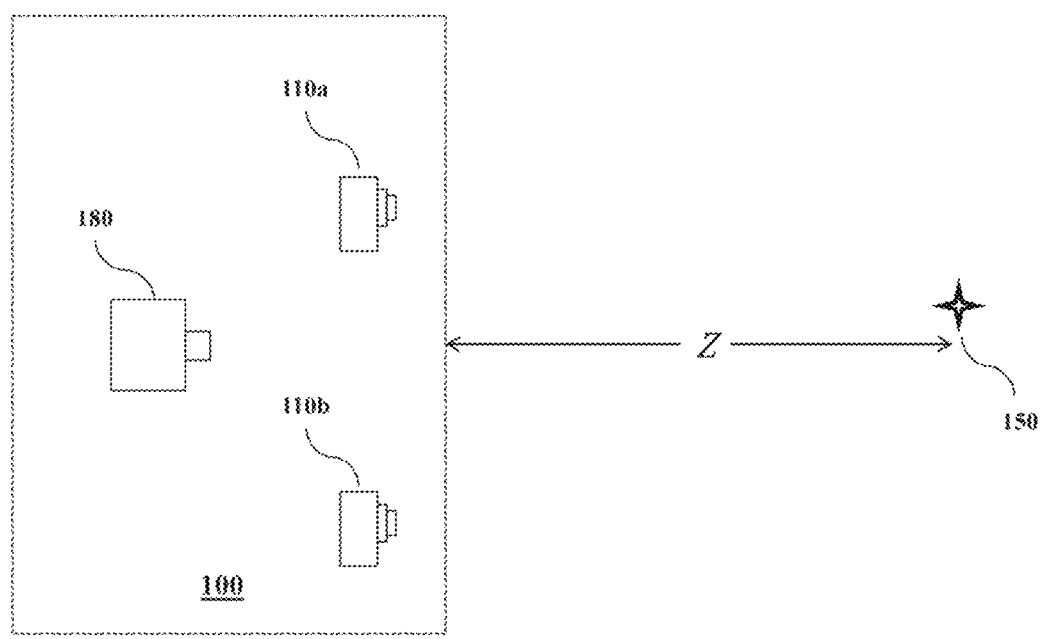
FIG. 16 is an exemplary diagram illustrating an embodiment of the imaging system of FIG. 1 directed toward an object of interest.

Turning now to FIG. 16, an exemplary imaging system 100 is shown as including components for determining an object distance Z between from the imaging system 100 to an object 150 of interest. In some embodiments, a plurality of imaging devices 110a and 110b of the imaging system 100 can use stereopsis to determine the object distance, as explained in further detail with respect to the method of FIG. 3. Alternatively and/or addition, the object distance can be determined using one or more auxiliary devices 180 that are capable of assessing depth.

In one embodiment, the auxiliary device 180 is a laser (for example, an infrared laser) having a light source that can emit light with specific spatial structures to the object 150 of interest. Additionally, such an auxiliary laser device 180 can be equipped with a lens and a filter chip for receiving the emitted light from the object 150 of interest. A controller 190 (shown in FIG. 1) can calculate the structures of the received light, and through variations of the light structures, can perceive the structure and distance information of the object 150 of interest. The power of the laser can be increased as needed to function in outdoor settings to overcome the infrared signature of sunlight.

In another embodiment, the auxiliary device 180 is an ultrasound system. An ultrasound auxiliary device 180 can have, for example, one or more ultrasound emitters and sensors (for example, arrayed ultrasound transducers) that determine the object distance Z using the time taken for ultrasound waves to be reflected back to the auxiliary device 180 by the object 150 of interest. In some embodiments, the ultrasound auxiliary device 180 can be integrated with one or more imaging devices 110 as a single device (for example, as a RGB-D camera for depth perception). Using multiple types of devices for sensing object distance can allow measurement be rendered more accurate by redundancy, and the measurements can be more robust to, and/or immune from, environmental conditions that may cause error in one type of auxiliary device 180 but not in another.

Figure 17:
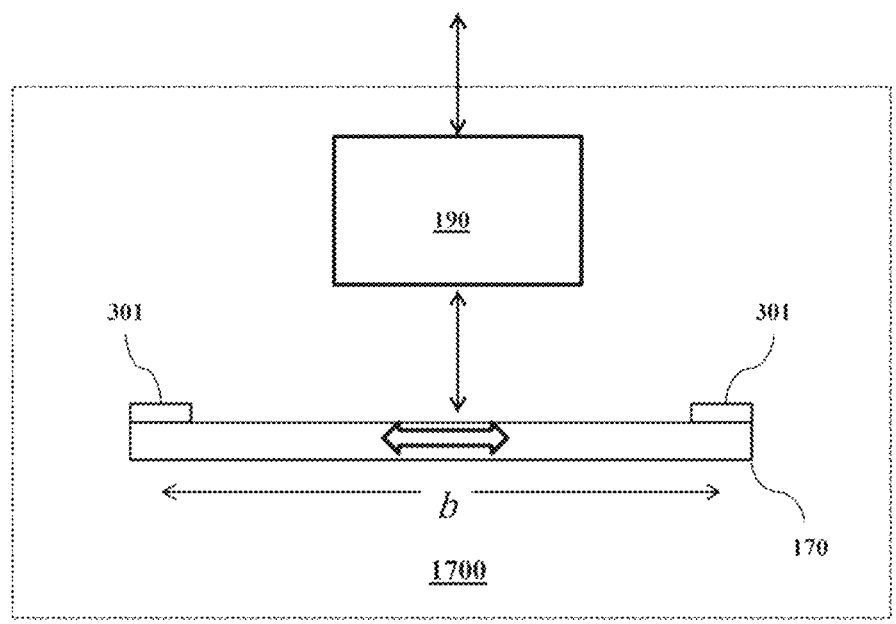
FIG. 17 is an exemplary top level diagram illustrating an embodiment of an apparatus for adjusting a baseline of the imaging system of FIG. 1.

Turning now to FIG. 17, an exemplary embodiment of a stand-alone atop apparatus 1700 for automatically adjusting a baseline between a first imaging device 110a (shown in FIG. 2) and a second imaging device 110b (shown in FIG. 2) is illustrated. The stand-alone apparatus 1700 can be readily configured for use with different imaging devices 110, such as with different types of imaging devices 110 or to replace a broken imaging device 110 with a new imaging device 110. Further, the stand-alone apparatus 1700 can be used with different imaging systems 100 (for example, with different mobile platforms such as different UAVs). The stand-alone apparatus 1700 includes a baseline adjustment mechanism 170 for adjusting the baseline b (shown in FIG. 2) and a controller 190 configured to automatically adjust the baseline b using the baseline adjustment mechanism 170 according to object distance between an imaging system and an object 150 of interest (not shown). The baseline adjustment mechanism 170 is described above with respect imaging system 100 (see, for example, FIG. 3). The baseline adjustment mechanism 170 can include a variety of components, as desired, for effectuating linear or non-linear motion of imaging devices 110 relative to one another or relative to surroundings. Exemplary components for effectuating motion include, but not limited to, motors (for example, stepper motors), screw shaft mechanisms, slide and crank mechanisms, rack and pinion mechanisms, linear motors, or the like. Additional components may facilitate and/or effectuate motion of the imaging devices 110, including but not limited to ball bearings, rail systems and runner blocks, end bearing supports, ball screws, slide bushes, slide screws, conveyer belts, pulleys, lubricants of various types, or the like. The apparatus 1700 can include end region units 1001*a* and 1001*b* that are configured to move linearly with respect to one another. An imaging device 110 can be mounted to each of the end region units 1001*a* and 1001*b*, thereby permitting translational motion of the imaging devices 110 relative to each other, and facilitating adjustment of a baseline b (not shown).

The controller 190 controls the functions of the baseline adjustment mechanism 170, thereby enabling adjustment of the baseline b to be automated. The controller 190 can transmit control data to the baseline adjustment mechanism 170 via a data communication component (for example, a serial bus; not shown). The controller 190 can further receive and/or transmit data externally for baseline adjustment (for example, through an input/output port). Alternatively and/or additionally, the controller 190 can receive and/or transmit data externally using a remote data communication system (not shown). The data transmitted by the controller 190 can include, for example, control signals to the baseline adjustment mechanism 170. Furthermore, the controller can receive images acquired by one or more the imaging devices 110. The controller 190 can also be configured, for example, to reconstruct a three-dimensional depiction of the object 150 of interest using via stereopsis, to determine whether a baseline adjustment is needed based on an object to the object 150 of interest, and so forth. The controller 190 can further be configured to automatically calibrate one or more extrinsic parameters for stereoscopic imaging, as discussed in greater detail above with the method of FIG. 9.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for automatically adjusting a baseline of an imaging system, comprising:
   acquiring, by a first imaging device, a first image of an object of interest, the imaging system including a controller, the first imaging device, a second imaging device, and a baseline adjustment mechanism coupled with the first and second imaging devices;
   acquiring, by the second imaging device, a second image of the object of interest, a first optical axis of the first imaging device being parallel to a second optical axis of the second imaging device;
   after obtaining the first and second images, rectifying the first image and the second image by removing image distortions;
   after the first and second images are rectified, calculating, by the controller, a binocular disparity between the first image and the second image;
   determining, by the controller, an object distance using the binocular disparity and focal distances of the first and second imaging devices, the object distance being measured between the imaging system and the object of interest; and
   automatically adjusting, by the baseline adjustment mechanism, the baseline according to the object distance, the baseline being a physical distance between the first imaging device and the second imaging device,
   wherein automatically adjusting the baseline comprises:
      if the baseline is greater than a maximum baseline, determining whether a first difference between the baseline and the maximum baseline is greater than a first tolerance;
      if the first difference is greater than the first tolerance, decreasing the baseline; and
      if the first difference is equal to or less than the first tolerance, skipping adjusting the baseline;
   wherein the maximum baseline is $Z*\tan(\Theta/2)$, and wherein Z is the object distance and $\Theta$ is an angle-of-vision of at least one of the imaging devices.

2. The method of claim 1, wherein determining the object distance comprises:
   acquiring a plurality of feature points on the object of interest;
   determining respective feature distances between the imaging system and the feature points based the binocular disparity between the feature points on the first and second images; and
   determining the object distance using the feature distances.

3. The method of claim 2, wherein determining the object distance comprises determining the object distance based on an average of the feature distances.

4. The method of claim 2, wherein determining the object distance comprises selecting one or more of the feature points and determining the object distance based on the feature distances of the selected feature points.

5. The method of claim 4, wherein selecting the feature points comprises selecting a predetermined percentage of feature points that are closest to the imaging system and determining the object distance as the feature distance of one of the selected feature points that is farthest from the imaging system.

6. The method of claim 2, wherein determining the respective feature distances between the imaging system and the feature points comprises determining the feature distances based on pixels corresponding to the feature points on the first image acquired by the first imaging device or the second image acquired by the second imaging device.

7. The method of claim 1, wherein automatically adjusting the baseline comprises increasing the baseline if the baseline is below a minimum baseline.

8. The method of claim 7, wherein the minimum baseline is $4*Z*L$ if, and wherein Z is the object distance, L is a pixel width of at least one of the imaging devices, andf is the focal distance of at least one of the first imaging device or the second imaging device.

9. The method of claim 1, wherein automatically adjusting the baseline further comprises increasing the baseline if the baseline is below the maximum baseline.

10. The method of claim 1, wherein automatically adjusting the baseline comprises increasing the baseline until a field-of-vision of the first imaging device overlaps with a field-of-vision of the second imaging device by at least a threshold value.

11. The method of claim 1, further comprising calibrating extrinsic parameters of the imaging system after automatically adjusting the baseline.

12. The method of claim 11, wherein calibrating the extrinsic parameters comprises calibrating at least one of a translational extrinsic parameter or a rotational extrinsic parameter of the imaging system.

13. The method of claim 12, wherein calibrating the extrinsic parameters comprises initially calibrating the translational extrinsic parameters according to a result of automatically adjusting the baseline.

14. The method of claim 13, wherein calibrating the extrinsic parameters further comprises optimizing the extrinsic parameters after initially calibrating the translational extrinsic parameters.

15. The method of claim 14, wherein optimizing the extrinsic parameters comprises applying a bundle adjustment on the extrinsic parameters.

16. An apparatus for automatically adjusting a baseline between a first imaging device and a second imaging device of an imaging system, comprising:
   a baseline adjustment mechanism being coupled with the first and second imaging devices, wherein:
      the first imaging device is configured to acquire a first image of an object of interest, and
      the second imaging device is configured to acquire a second image of the object of interest, a first optical axis of the first imaging device being parallel to a second optical axis of the second imaging device; and
   a controller configured to:
      after obtaining the first and second images, rectifying the first image and the second image by removing image distortions;
      after the first and second images are rectified, calculate a binocular disparity between the first image and the second image;
      determine an object distance using the binocular disparity and focal distances of the first and second imaging devices, the object distance being measured between the imaging system and the object of interest; and
      provide a control signal to the baseline adjustment mechanism for automatically adjusting the baseline according to the object distance, comprising:
         if the baseline is greater than a maximum baseline, determining whether a difference between the baseline and the maximum baseline is greater than a tolerance;
         if the difference is greater than the tolerance, decreasing the baseline; and
         if the difference is equal to or less than the tolerance, skipping adjusting the baseline;
      wherein the maximum baseline is $Z*\tan(\Theta/2)$, and wherein $Z$ is the object distance and $\Theta$ is an angle-of-vision of at least one of the imaging devices.

17. The method of claim 1, wherein rectifying the first image and the second image comprises:
   putting the first and second images on a same plane by at least one of: image rotation, image scaling, or adjusting for skew to line up corresponding pixels in the first and second images.

18. The method of claim 1, wherein rectifying the first image and the second image comprises:
   removing image distortion based on a set of extrinsic parameters that convey translational and rotational relationship between the first and the second imaging devices.

19. The method of claim 1, wherein automatically adjusting the baseline further comprises:
   if the baseline is below a maximum baseline, increasing the baseline until the baseline reaches the maximum baseline.

20. The method of claim 7, wherein automatically adjusting the baseline further comprises:
   if the baseline is below a minimum baseline, determining whether a second difference between the baseline and the minimum baseline is greater than a second tolerance;
   if the second difference is greater than the second tolerance, increasing the baseline; and
   if the second difference is equal to or less than the second tolerance, skipping adjusting the baseline.

* * * * *